(12) United States Patent
Hudelson et al.

(10) Patent No.: US 10,906,249 B2
(45) Date of Patent: Feb. 2, 2021

(54) METHOD FOR REDUCING LAYER SHIFTING AND SMEARING DURING 3D PRINTING

(71) Applicant: Desktop Metal, Inc., Burlington, MA (US)

(72) Inventors: George Hudelson, Billerica, MA (US); Alexander Nicholas LeGendre, Boston, MA (US); Kelvin Wiebe, Chelmsford, MA (US)

(73) Assignee: Desktop Metal, Inc., Burlington, MA (US)

( * ) Notice: Subject to any disclaimer, the term of this patent is extended or adjusted under 35 U.S.C. 154(b) by 0 days.

(21) Appl. No.: 15/971,541

(22) Filed: May 4, 2018

(65) Prior Publication Data

US 2019/0210294 A1    Jul. 11, 2019

Related U.S. Application Data

(60) Provisional application No. 62/614,132, filed on Jan. 5, 2018.

(51) Int. Cl.
   *B29C 64/40*    (2017.01)
   *B22F 3/105*    (2006.01)
   (Continued)

(52) U.S. Cl.
   CPC .............. *B29C 64/40* (2017.08); *B22F 3/008* (2013.01); *B22F 3/1055* (2013.01); *B28B 1/001* (2013.01);
   (Continued)

(58) Field of Classification Search
   CPC .............................. B29C 64/40; B29C 64/165
   (Continued)

(56) References Cited

U.S. PATENT DOCUMENTS 5,204,055 A    4/1993    Sachs et al.
6,217,649 B1   4/2001    Wallace, Jr. et al.
(Continued)

FOREIGN PATENT DOCUMENTS

DE    102013007482 A1    10/2014
EP         1700686 A2     9/2006
(Continued)

OTHER PUBLICATIONS

"New Process to 3D Print Metal for Mass Production." Star Rapid. Available Aug. 28, 2017. <https://www.starrapid.com/blog/new-process-to-3d-print-metal-for-mass-production/> (Year: 2017).*
(Continued)

*Primary Examiner* — Matthew J Daniels
*Assistant Examiner* — Hana C Page
(74) *Attorney, Agent, or Firm* — Wiggin and Dana LLP; Jonathan D. Hall; Joseph Casino

(57) ABSTRACT

An additive manufacturing system, and corresponding method, prints a sacrificial component using a 3D printing system that includes a spreading mechanism for spreading unbound powder to form layers of a powder bed and a printing mechanism for jetting binder fluid into the unbound powder to form the sacrificial component. The system forms the sacrificial component with a feature that provides a resistive force to a shear force imposed by the spreading mechanism during the spreading. The system prints a part with the 3D printing system in a coupled arrangement with the sacrificial component. The coupled arrangement in combination with the resistive force is sufficient to immobilize each printed layer of the part to resist the shear force imposed by the spreading mechanism during spreading of the unbound powder above each printed layer of the part. After printing, and before or after post-processing, the part and sacrificial component are separated.

8 Claims, 19 Drawing Sheets

(51) Int. Cl.
  *B33Y 10/00* (2015.01)
  *B33Y 30/00* (2015.01)
  *B33Y 50/02* (2015.01)
  *B29C 64/393* (2017.01)
  *B29C 64/165* (2017.01)
  *B22F 3/00* (2006.01)
  *B28B 1/00* (2006.01)
  *B28B 11/24* (2006.01)
  *B28B 17/00* (2006.01)

(52) U.S. Cl.
  CPC ........ *B28B 11/243* (2013.01); *B28B 17/0081* (2013.01); *B29C 64/165* (2017.08); *B29C 64/393* (2017.08); *B33Y 10/00* (2014.12); *B33Y 30/00* (2014.12); *B33Y 50/02* (2014.12); *B22F 2003/1058* (2013.01)

(58) Field of Classification Search
  USPC ........................................................ 264/318
  See application file for complete search history.

(56) References Cited

U.S. PATENT DOCUMENTS

| | | | |
|---|---|---|---|
| 6,238,614 B1 | 5/2001 | Yang et al. | |
| 7,241,415 B2 | 7/2007 | Khoshnevis | |
| 7,917,243 B2* | 3/2011 | Kozlak | G06F 17/50 264/512 |
| 8,432,157 B2 | 4/2013 | Fitch | |
| 10,124,540 B2* | 11/2018 | Ooba | B22F 3/008 |
| 2004/0239009 A1 | 12/2004 | Collins et al. | |
| 2005/0074550 A1 | 4/2005 | Leuterer et al. | |
| 2011/0293823 A1 | 12/2011 | Bruderer et al. | |
| 2014/0300017 A1 | 10/2014 | Wighton et al. | |
| 2015/0352639 A1* | 12/2015 | Toyserkani | B29C 67/02 428/201 |
| 2015/0360421 A1* | 12/2015 | Burhop | G05B 19/4099 264/401 |
| 2015/0367415 A1 | 12/2015 | Buller et al. | |
| 2016/0075084 A1 | 3/2016 | Sakura | |
| 2017/0173891 A1 | 6/2017 | Bosveld et al. | |
| 2017/0225227 A1 | 8/2017 | Volk | |
| 2017/0312822 A1 | 11/2017 | Kimblad | |
| 2017/0326789 A1 | 11/2017 | Kimblad et al. | |
| 2018/0056595 A1* | 3/2018 | Sterenthal | B33Y 10/00 |
| 2018/0154580 A1* | 6/2018 | Mark | B29C 64/118 |
| 2018/0304301 A1 | 10/2018 | Sachs et al. | |
| 2018/0304302 A1 | 10/2018 | Sachs et al. | |

FOREIGN PATENT DOCUMENTS

| | | |
|---|---|---|
| WO | 03/026876 A2 | 4/2003 |
| WO | 2016/176432 A1 | 11/2016 |
| WO | 2017/040458 A1 | 3/2017 |

OTHER PUBLICATIONS

&Nbsp;"Metal 3d printing soon 'affordable' thanks to new Selective Inhibition Sintering (SIS) process." Available Nov. 11, 2014. <https://www.3ders.org/articles/20141111-metal-3d-printing-soon-affordable-new-selective-inhibition-sintering-process.html> (Year: 2014).*

Griffith, et al., "Simultaneous, noninvasive measurements of convective heat transfer and solid volume fraction at the wall of an entrained gas-solid suspension," Review of Scientific Instruments, vol. 71(7); pp. 2922-2927, Jul. 2000.

Louge, et al., "Capacitance measurements of the volume fraction and velocity of dielectric solids near a grounded wall," Rev. Sci. Instrum., 67(5), pp. 1869-1877, May 1996.

International Search Report and Written Opinion in PCT Application No. PCT/US2019/012309, dated May 17, 2019 (21 pages).

* cited by examiner

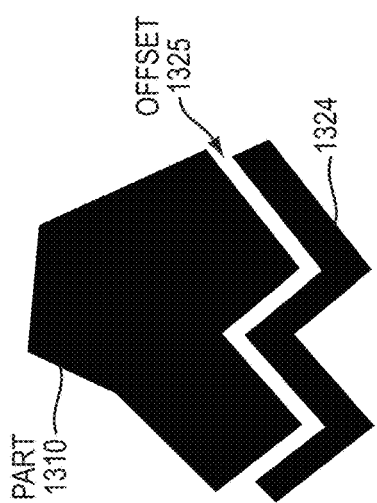
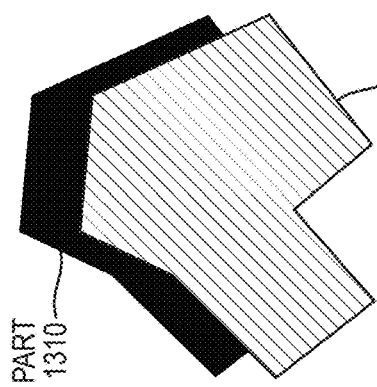
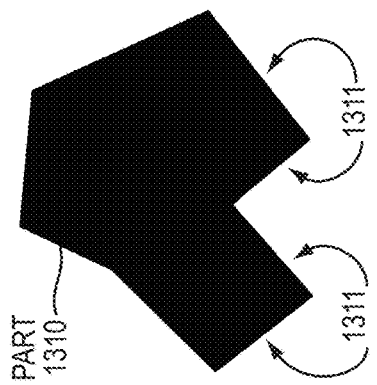
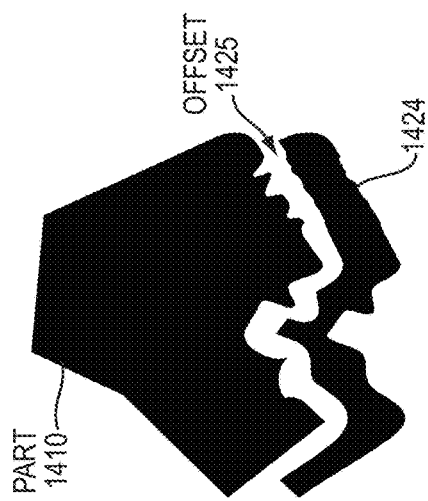
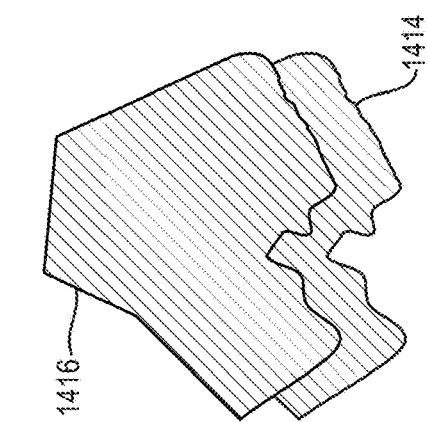
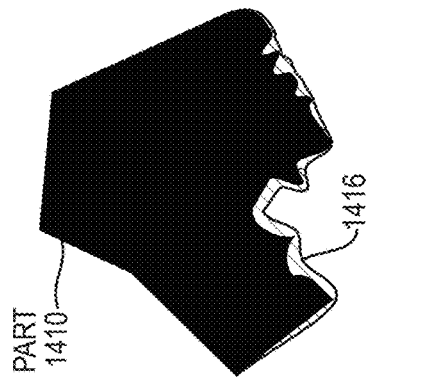
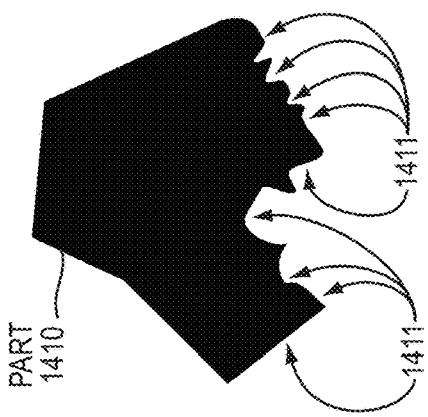

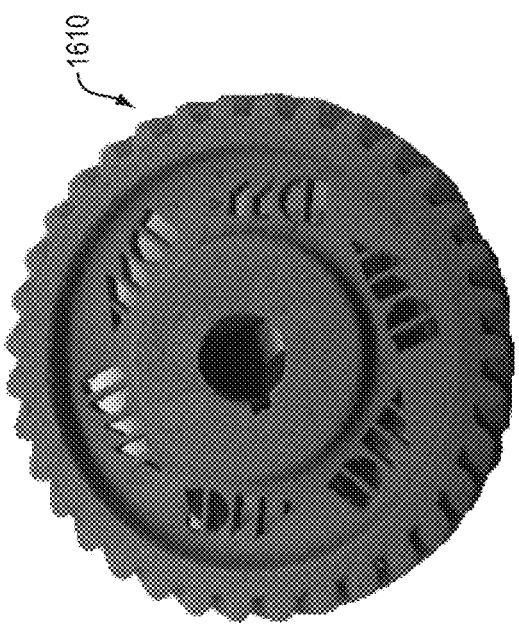
FIG. 16A
FIG. 16B
FIG. 16C

METHOD FOR REDUCING LAYER SHIFTING AND SMEARING DURING 3D PRINTING

RELATED APPLICATION

This application claims the benefit of U.S. Provisional Application No. 62/614,132, filed on Jan. 5, 2018. The entire teachings of the above application are incorporated herein by reference.

BACKGROUND

Binder jetting is an additive manufacturing technique based on the use of a liquid binder to join particles of a powder material, also referred to interchangeably herein as powder, to form a three-dimensional (3D) object. In particular, a controlled pattern of the liquid binder may be applied to successive layers of the powder material in a powder bed such that the layers of the powder material adhere to one another to form the 3D object. Through subsequent processing, such as sintering, the 3D object may be formed into a finished object that may be referred to as a finished 3D part.

SUMMARY

According to an example embodiment, an additive manufacturing method may comprise printing a sacrificial component using a three-dimensional (3D) printing system. The 3D printing system may include (i) a spreading mechanism for spreading unbound powder to form layers of a powder bed and (ii) a printing mechanism for jetting binder fluid into the unbound powder to form the sacrificial component. The sacrificial component is formed with a feature that provides a resistive force to a shear force imposed by the spreading mechanism during the spreading. The method may comprise printing a part with the 3D printing system in a coupled arrangement with the sacrificial component. The coupled arrangement in combination with the resistive force is sufficient to immobilize each printed layer of the part in the powder bed to resist the shear force imposed by the spreading mechanism during spreading of the unbound powder above each printed layer of the part.

The feature of the sacrificial component may be a given number of printed layers, an inverse geometric feature that complements a geometric feature of the part, or a combination thereof.

The part and the sacrificial component may be coupled in the coupled arrangement via an indirect mechanical coupling formed of unbound powder.

Printing the part may include printing at least a portion of the part above the sacrificial component. The part and the sacrificial component may be coupled in the coupled arrangement via a direct mechanical coupling. The method may further comprise forming the direct mechanical coupling by spreading one or more layers of the unbound powder and jetting binder fluid into same in a manner that creates a lattice connection between the at least a portion of the part and the sacrificial component.

Printing the part may include printing at least a portion of the part above the sacrificial component. The part and the sacrificial component may be coupled in the coupled arrangement via a direct mechanical coupling formed of an anti-sintering agent. The method may further comprise applying the anti-sintering agent to a surface of the sacrificial component to form a separation layer between the at least a portion of the at least a portion of the part and the sacrificial component and decoupling the sacrificial component from the part via sintering of the coupled arrangement.

Printing the part may include printing at least a portion of the part above the sacrificial component and the at least a portion of the part may be the entire part.

Printing the sacrificial component may include: printing the sacrificial component with a component shape that extends laterally beyond a part shape of the part; printing one or more layers of the sacrificial component and the part to extend the sacrificial component and the part vertically upward and alongside each other; or a combination thereof.

Printing the sacrificial component may include creating the sacrificial component with one or more gaps of unbound powder, the one or more gaps facilitating decoupling of the sacrificial component from the part.

Printing the sacrificial component may include jetting the binder fluid into the unbound powder in a manner that prints the sacrificial component as a lattice structure.

Printing the sacrificial component may include printing multiple sacrificial components each having a direct or indirect mechanical coupling with a respective sacrificial component-facing surface of the part.

The part may have a part shape. Printing the sacrificial component may include printing the sacrificial component with a complementary shape relative to the part shape. The complementary shape may conform to a topography of the part shape at least sufficiently enough to provide for the coupled arrangement.

The method may further comprise creating a 3D computer-aided design (CAD) model of the coupled arrangement by duplicating a part 3D CAD model for the part to produce a copy of the part 3D CAD model; translating the copy in a translation direction to produce a translated copy; performing a 3D Boolean subtraction to subtract the part 3D CAD model from the translated copy to produce a sacrificial component 3D CAD model for the sacrificial component; and applying an offset between the part 3D CAD model and the sacrificial component 3D CAD model, wherein the part and the sacrificial component are printed according to the part 3D CAD model and the sacrificial component 3D CAD model, respectively.

The method may further comprise creating a 3D CAD model of the coupled arrangement by approximating surfaces of a part 3D CAD model for the part to produce an approximated version, the approximated version being offset from the part 3D CAD model in an outward direction; translating the approximated version in a translation direction to produce a translated approximated version; performing a 3D Boolean subtraction to subtract the approximated version from the translated approximated version to produce a sacrificial component 3D CAD model for the sacrificial component; and applying an offset between the part 3D CAD model and the sacrificial component 3D CAD model, wherein the part and the sacrificial component are printed according to the part 3D CAD model and the sacrificial component 3D CAD model, respectively.

Printing the sacrificial component may include jetting binder fluid at a first saturation level. Printing the part may include jetting binder fluid at a second saturation level. The first saturation level may be lower relative to the second saturation level.

According to another example embodiment, an additive manufacturing system may comprise a spreading mechanism, printing mechanism, and controller. The controller may be configured to (i) drive the spreading mechanism to spread unbound powder to form layers of a powder bed and (ii) drive the printing mechanism to jet binder fluid into the unbound powder to print a sacrificial component and a part. The controller may be further configured to drive the printing mechanism to form the sacrificial component with a feature that provides a resistive force to a shear force imposed by the spreading mechanism during the spreading and print the part in a coupled arrangement with the sacrificial component. The coupled arrangement in combination with the resistive force is sufficient to immobilize each printed layer of the part in the powder bed to resist the shear force imposed by the spreading mechanism during spreading of the unbound powder above each printed layer of the part.

The feature of the sacrificial component may be a given number of printed layers, an inverse geometric feature that complements a geometric feature of the part, or a combination thereof.

The part and the sacrificial component may be coupled in the coupled arrangement via an indirect mechanical coupling formed of unbound powder.

The controller may be further configured to drive the printing mechanism to print at least a portion of the part above the sacrificial component. The part and the sacrificial component may be coupled in the coupled arrangement via a direct mechanical coupling. The controller may be further configured to form the direct mechanical coupling by driving the spreading mechanism to spread one or more layers of the unbound powder and driving the printing mechanism to jet binder fluid into same in a manner that creates a lattice connection between the at least a portion of the part and the sacrificial component.

The controller may be further configured to drive the printing mechanism to print at least a portion of the part above the sacrificial component. The part and the sacrificial component may be coupled in the coupled arrangement via a direct mechanical coupling formed of an anti-sintering agent. The system may further comprise a sintering mechanism. The controller may be further configured to drive the printing mechanism to apply the anti-sintering agent to a surface of the sacrificial component to form a separation layer between the at least a portion of the part and the sacrificial component and drive the sintering mechanism to sinter the coupled arrangement to decouple the at least a portion of the part from the sacrificial component.

The controller may be further configured to drive the printing mechanism to print at least a portion of the part above the sacrificial component and the at least a portion of the part may be the entire part.

The controller may be further configured to: drive the printing mechanism to print the sacrificial component with a component shape that extends laterally beyond a part shape of the part; print one or more layers of the sacrificial component and the part that extend the sacrificial component and the part vertically upward and alongside each other; or a combination thereof.

The controller may be further configured to drive the printing mechanism to create the sacrificial component with one or more gaps of the unbound powder to facilitate decoupling of the sacrificial component from the part.

The controller may be further configured to drive the printing mechanism to jet the binder fluid into the unbound powder in a manner that prints the sacrificial component as a lattice structure.

The controller may be further configured to drive the printing mechanism to print the sacrificial component as multiple sacrificial components each having a direct or indirect mechanical coupling with a respective sacrificial component-facing surface of the part.

The part may have a part shape and the controller may be further configured to drive the printing mechanism to print the sacrificial component with a complementary shape relative to the part shape. The complementary shape may conform to a topography of the part shape at least sufficient enough to provide for the coupled arrangement.

The controller may be further configured execute instructions or interpret codes that were generated according to a 3D computer-aided design (CAD) model to drive the printing mechanism to print the sacrificial component and the part in the coupled arrangement.

The controller may be further configured to drive the printing mechanism to: print the sacrificial component by jetting binder fluid at a first saturation level; and print the part by jetting binder fluid at a second saturation level, wherein the first saturation level may be lower relative to the second saturation level.

According to yet another example embodiment, a non-transitory computer-readable medium may have encoded thereon a sequence of instructions which, when loaded and executed by at least one processor, causes a three-dimensional (3D) printing system to drive a spreading mechanism of the 3D printing system to spread unbound powder to form layers of a powder bed and drive a printing mechanism of the 3D printing system to jet binder fluid into the unbound powder to print a sacrificial component and a part. The sequence of instructions may further cause the 3D printing system to drive the printing mechanism to form the sacrificial component with a feature that provides a resistive force to a shear force imposed by the spreading mechanism during the spreading and print the part in a coupled arrangement with the sacrificial component. The coupled arrangement in combination with the resistive force is sufficient to immobilize each printed layer of the part in the powder bed to resist the shear force imposed by the spreading mechanism during spreading of the unbound powder above each printed layer of the part.

It should be understood that example embodiments disclosed herein can be implemented in the form of a method, apparatus, system, or computer readable medium with program codes embodied thereon.

BRIEF DESCRIPTION OF THE DRAWINGS

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

FIG. 13A is a block diagram of an example embodiment of a part with a part shape that includes multiple downward-facing surfaces.

FIG. 13B is a block diagram of an example embodiment of a part and a copy of the part.

FIG. 13C is a block diagram of an example embodiment of a result from a 3D Boolean subtraction with an offset applied thereto.

FIG. 14A is a block diagram of another example embodiment of a part with a part shape that includes multiple downward-facing surfaces.

FIG. 14B is a block diagram of an example embodiment of an approximated version of the part of FIG. 14A.

FIG. 14C is a block diagram of an example embodiment of a translated approximated version of the approximated version of FIG. 14B.

FIG. 14D is a block diagram of an example embodiment of another result from a 3D Boolean subtraction with an offset applied thereto.

FIG. 16A is an image of an example embodiment of a portion of a part 1610 with layer shifting.

FIG. 16B is an image of an example embodiment of the part 1610 of FIG. 16A without layer shifting and a sacrificial component 1624.

FIG. 16C is an image of the example embodiment of the part 1610 of FIG. 16B without layer shifting.

DETAILED DESCRIPTION

A description of example embodiments follows.

In a binder jetting process, a thin layer of powder (e.g., 50 µm) is spread onto a powder bed, followed by deposition of a liquid binder in a two-dimensional (2D) pattern or image that represents a single "slice" of a three-dimensional (3D) shape. After deposition of the liquid binder, another layer of powder is spread, and the process is repeated to form the 3D shape of bound powder material inside the powder bed. Powder spreading may be accomplished by means of a dispensing apparatus that deposits a pile of powder onto the powder bed. The pile of powder may then be spread, rolled, smoothed, or compacted by means of a spreading mechanism, such as a counter-rotating roller, doctor blade, or other means for spreading. After printing, the bound part is removed from the excess unbound powder, and sintered at high temperature to bind the particles together. Sintering may be performed to densify the part to full density (i.e., removal of all void space) or may be performed to bond the particles only lightly without substantial removal of void space.

During the process of spreading a new layer of powder onto the powder bed, the spreading mechanism can apply a shear force, also referred to interchangeably herein as a shearing force, that can cause defects in one or more previously printed layers. These defects can include: "shifting" (i.e., translation of layers in the powder bed); and "cracking" (i.e., breakup of the layers). Such defects may be referred to collectively herein as "smearing," "shifting," or "cracking," but all generally refer to the "smeared" or "shifted" layers of a printed part. An example embodiment disclosed herein prevents such layer "shifting," "smearing," and "cracking" of layers of printed parts by means of immobilizing the layers during printing by printing a sacrificial component, also referred to interchangeably herein as a "raft," under one or more portions of the part being printed. As such, a method may reduce layer shifting and smearing during 3D printing by means of sacrificial printed raft(s).

Figure 1A:
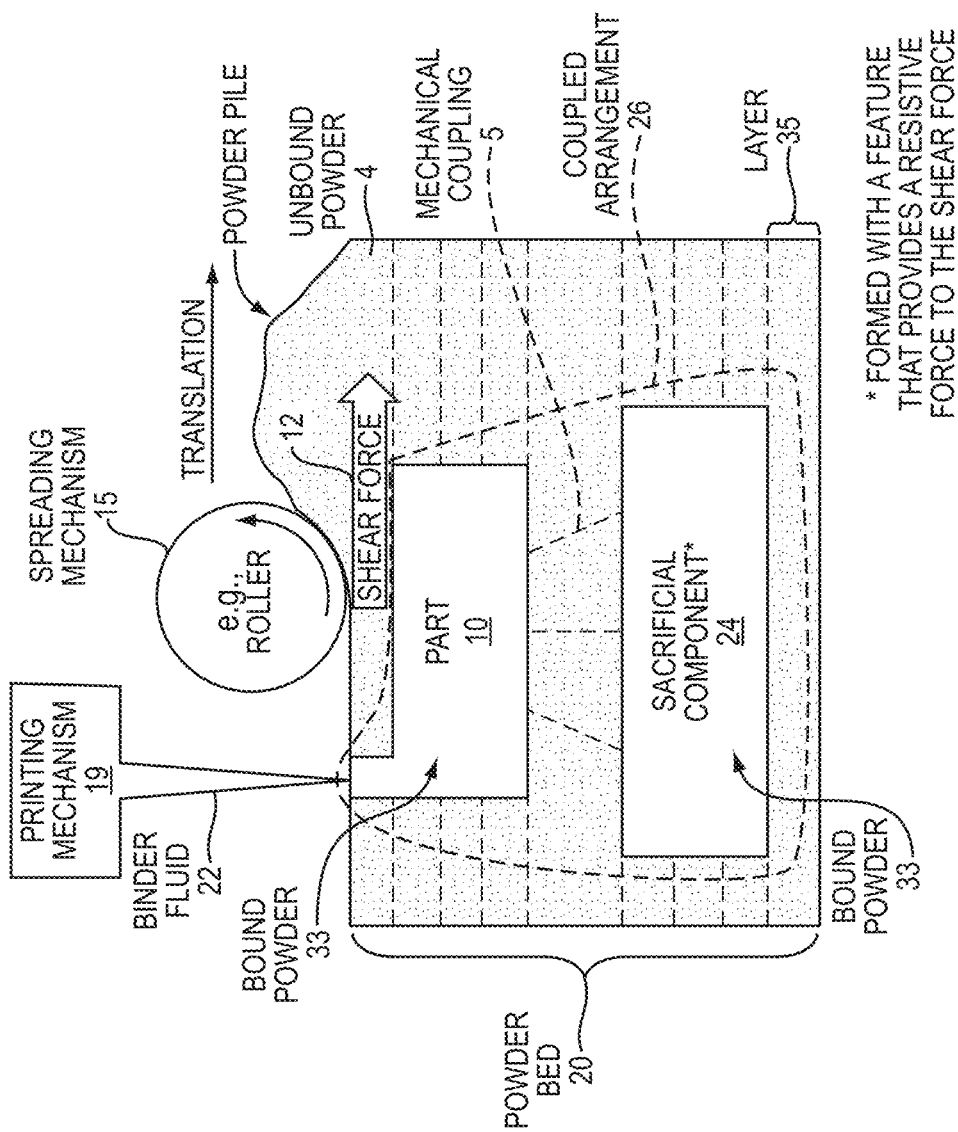
FIG. 1A is a block diagram of an example embodiment of a sacrificial component and a part within a powder bed.

FIG. 1A is a block diagram of an example embodiment of a sacrificial component 24 and a part 10 within a powder bed 20. The sacrificial component 24 is printed using a three-dimensional (3D) printing system (not shown), such as the 3D printing system 250 of FIG. 2A, disclosed further below, or any other suitable 3D printing system that includes (i) a spreading mechanism 15 for spreading unbound powder 4 to form layers of a powder bed 20, such as the layer 35 of the powder bed 20, and (ii) a printing mechanism 19 for jetting binder fluid 22 into the unbound powder 4 to form the sacrificial component 24. Jetting the binder fluid 22 into the unbound powder 4 produces the bound powder 33. Regions of the bound powder 33 may be referred to as "printed" regions. The sacrificial component 24 is formed with a feature (not shown) that provides a resistive force (not shown) to a shear force 12 imposed by the spreading mechanism 15 during the spreading. The resistive force may be represented as one or more vector arrows (not shown) that are equal and opposite to vector arrows of the shear force 12. The part 10 is printed with the 3D printing system in a coupled arrangement 26 with the sacrificial component 24. The coupled arrangement 26 in combination with the resistive force is sufficient to immobilize each printed layer of the part 10 in the powder bed 20 to resist the shear force 12 imposed by the spreading mechanism 15 during spreading of the unbound powder 4 above each printed layer of the part 10.

According to an example embodiment, at least a portion of the unbound powder 4 provides the resistive force. The part 10 and the sacrificial component 24 may be coupled in the coupled arrangement 26 via a mechanical coupling 5. The mechanical coupling 5 may be a direct or indirect mechanical coupling. For example, the mechanical coupling 5 may be a direct mechanical coupling formed by at least a portion of the part 10 being bound directly to the sacrificial component 24 or by at least of portion of the part 10 and the sacrificial component 24 each being bound to a printed structure interposed therebetween, such as the lattice structure 1121 of FIG. 11A, disclosed below, or any other suitable printed structure. The part 10 and the sacrificial component may be printed as a single printed part in the coupled arrangement 26. According to an example embodiment, the part 10 and the sacrificial component 24 may be printed in a coupled arrangement 26 with a mechanical coupling 5 that is an indirect mechanical coupling, for example, the indirect mechanical coupling may be formed of unbound powder 4.

The feature of the sacrificial component 24 may be a given number of printed layers, an inverse geometric feature that complements a geometric feature of the part, or a combination thereof. Example embodiments of the feature are disclosed, further below.

Figure 1B:
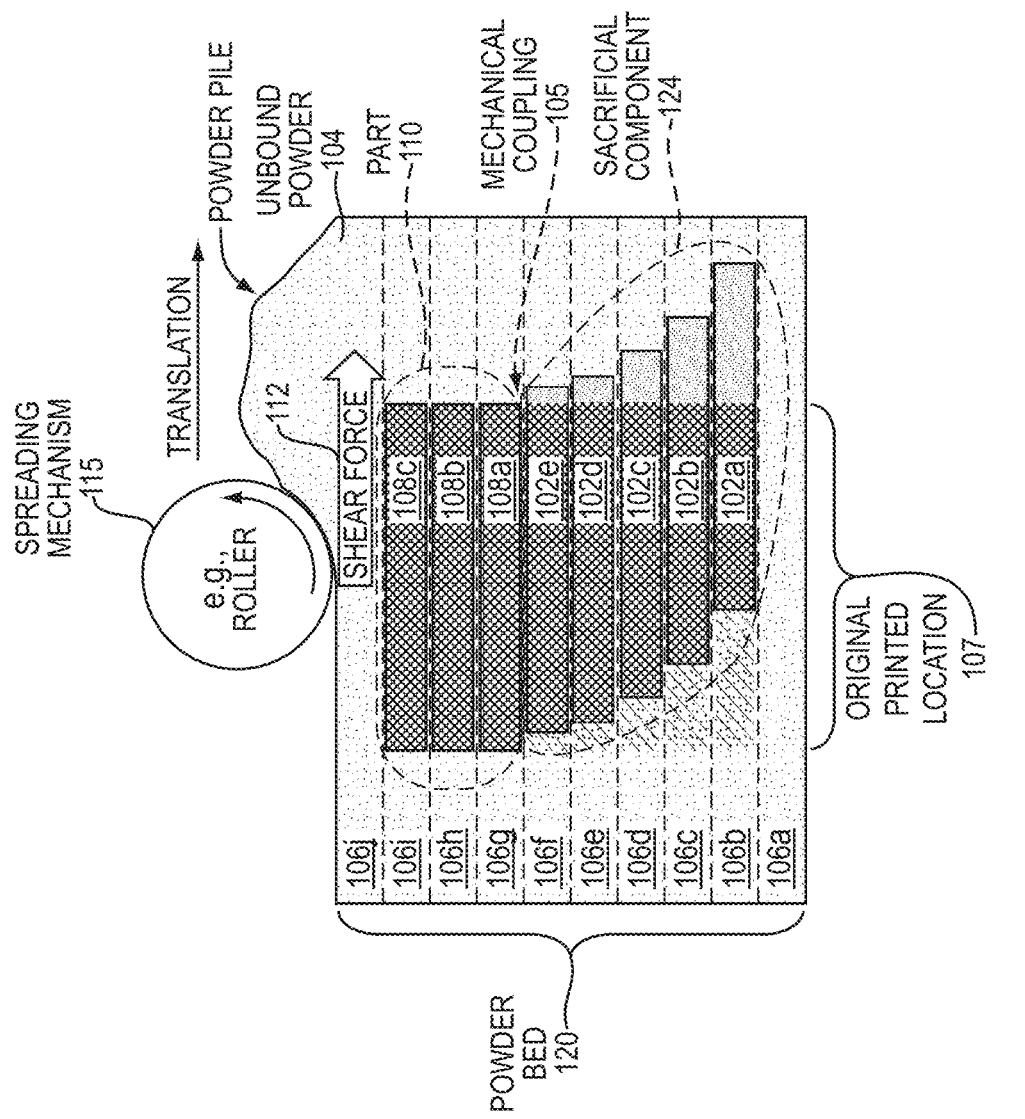
FIG. 1B is a block diagram of another example embodiment of a sacrificial component and a part within a powder bed.

FIG. 1B is a block diagram of another example embodiment of a sacrificial component 124 and a part 110 within a powder bed 120. The sacrificial component 124 and the part 110 may be printed by a 3D printing system (not shown) in a coupled arrangement, as disclosed above. In the example embodiment of FIG. 1B, at least a portion of the part 110 is printed above the sacrificial component 124 and is coupled to the sacrificial component 124 via a direct mechanical coupling 105 as the printed layer 108a of the part is bound to at least a portion of the printed layer 102e of the sacrificial component 124. In the example embodiment of FIG. 1B, the sacrificial component 124 is formed with a feature that provides a resistive force (not shown) to a shear force 112 imposed by spreading of the unbound powder 104 by the spreading mechanism 115. In the example embodiment, the feature of the sacrificial component 124 includes a given number of printed layers, that is, five, in the example embodiment, namely, the printed layers 102a-e that are located below the mechanical coupling 105.

The sacrificial component 124 and the part 110 reside within a powder bed 120. Printing of the sacrificial component 124 and the part 110 includes jetting binder fluid (not shown) into layers of the unbound powder 104 of the powder bed 120 spread by the spreading mechanism 115 on a layer-by-layer basis, such as disclosed below with reference to FIG. 2A.

In the example embodiment of FIG. 1B, printing of the sacrificial component 124 includes jetting binder fluid into the powder layers 106b, 106c, 106d, 106e, and 106f, while printing of the part 110 includes jetting binder fluid into the powder layers 106g, 106h, and 106i, of the plurality of powder layers 106a-j that are spread by the spreading mechanism 115, yielding the printed layers 102a-e of the sacrificial component and the printed layers 108a-c of the part 110.

According to the example embodiment, the coupled arrangement of the part 110 and the sacrificial component 124 in combination with the resistive force of the feature, that is, the given number of layers of the sacrificial component 124, is sufficient to immobilize each printed layer of the part 110, that is, the printed layers 108a-c, to resist the shear force 112 imposed by the spreading mechanism 115 during spreading of the unbound powder 104 at powder layers 106h, 106i, and 106j, each above a printed layer of the part 110. It should be understood that the powder layers 106b-f include the printed layers 102a-e and that the printed layers 102a-e reflect portions of their respective powder layers 106b-f that have binder fluid applied thereto. Further, the powder layers 106g-i include the printed layers 108a-c and the printed layers 108a-c reflect portions of their respective powder layers 106g-i that have binder fluid applied thereto. The shear force 112 is imposed by physical interaction of the spreading mechanism 115 with the powder layers 106b-j. After printing, and before or after post-processing, the part 110 is separated from the sacrificial component 124. Following decoupling from the part 110, the sacrificial component 124 may be disposed of, having served to ensure quality of the part 110 (e.g., preventing smearing of the part 110) during the printing process.

As illustrated in FIG. 1B, the printed layers 102a-e of the sacrificial component 124 experience shifting, relative to a respective original printed location 107, due to the shear force 112. Because the sacrificial component 124 already absorbed effects of the shear force 112 and because the part 110 is printed in a coupled arrangement with the sacrificial component 124, the printed layers 108a-c of the part 110 resist the shear force 112 and, thus, do not experience shifting. In the example embodiment, the given number of layers of the sacrificial component 124 is five; however, the given number may be any suitable number that enables printed layer(s) of the part 110 to resist the shear force 112 caused by the spreading mechanism 115. Further, it should be understood that the part 110 may have any suitable shape or number of printed layers to form a target 3D part. In addition, while FIG. 1B discloses spreading of the powder layer 106j, it should be understood that such spreading is shown for illustrative purposes to show the shear force 112 and that a powder layer may not be spread over the part 110 following printing of the part 110.

Figure 2A:
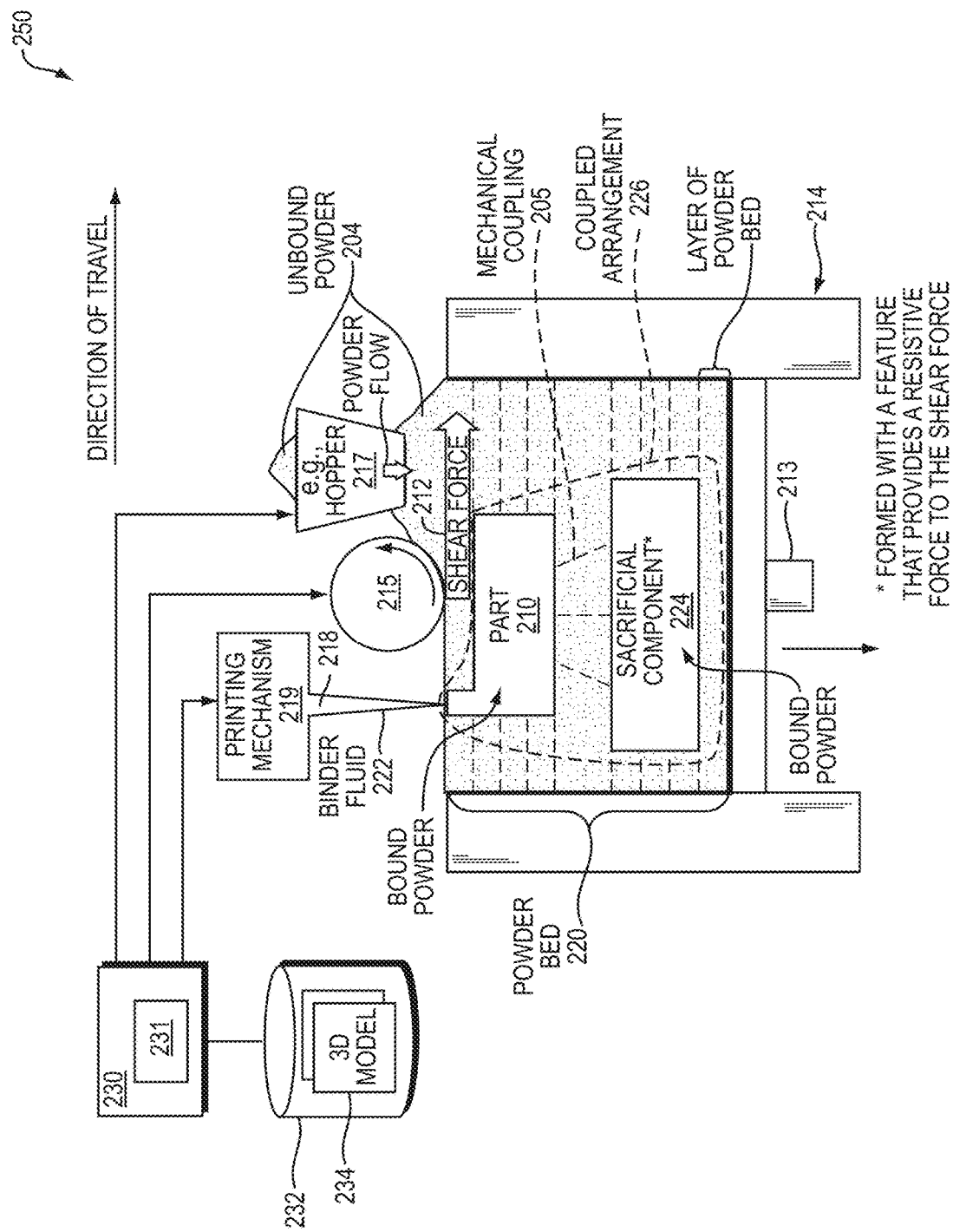
FIG. 2A is a block diagram of an example embodiment of an additive manufacturing system.

FIG. 2A is a block diagram of an example embodiment of an additive manufacturing system 250. The additive manufacturing system 250 comprises a spreading mechanism 215, printing mechanism 219, and controller 230. The controller 230 is configured to (i) drive the spreading mechanism 215 to spread unbound powder 204 to form layers of a powder bed 220 and (ii) drive the printing mechanism 219 to jet binder fluid 222 into the unbound powder 204 to print a sacrificial component 224 and a part 210. The controller 230 is further configured to drive the printing mechanism 219 to form the sacrificial component 224 with a feature that provides a resistive force to a shear force 212 imposed by the spreading mechanism 215 during the spreading and print the part 210 in a coupled arrangement 226 with the sacrificial component 224. The coupled arrangement 226 in combination with the resistive force is sufficient to immobilize each printed layer of the part 210 in the powder bed 220 to resist the shear force 212 imposed by the spreading mechanism 215 during spreading of the unbound powder 204 above each printed layer of the part 210.

The feature of the sacrificial component 224 may be a given number of printed layers, an inverse geometric feature that complements a geometric feature of the part 210, or a combination thereof. It should be appreciated that any one or more methods described with respect to the formation of a given layer of the part 210 or sacrificial component 224 may be repeated as necessary to form a respective plurality of layers making up the part 210 or sacrificial component 224. The sacrificial component 224 and the part 210 are three-dimensional (3D) objects. The unbound powder 204 may include, without limitation, metallic particles, ceramic particles, polymeric particles, and combinations thereof. The additive manufacturing system may further comprise a sintering mechanism (not shown). The part 210, sacrificial component 224, or a combination thereof, may be subsequently processed (e.g., sintered) by the sintering mechanism (not shown) to form a finished part that is separate from the sacrificial component 224. In addition to sintering, other processing of the part 210 may be performed to form the finished part.

The additive manufacturing system 250 may further comprise a powder supply 217, print box 214, and nozzle 218. The print box 214 includes a build platform 213, such as a piston, that is moveable within the print box 214. The print box 214 may have any suitable shape and includes walls which, in combination with a top surface of the build platform 213, contains the powder bed 220 which is formed by spreading layers of the unbound powder 204 above the build platform 213. The powder supply 217 is a dispensing apparatus that deposits a pile of the unbound powder 204 onto the powder bed 220. According to the example embodiment, the dispensing apparatus is a hopper with an opening from which the unbound powder 204 flows to deposit the pile of unbound powder 204. The pile of unbound powder 204 may then be spread, rolled, smoothed, or compacted by means of the spreading mechanism 215, such as a counter-rotating roller, doctor blade, or other means for spreading.

The build platform 213 is configured to move downward within the print box 214 following spreading of a layer of the unbound powder 204 and, optionally, jetting the binder fluid 222 into same. The spreading mechanism 215 is moveable along the print box 214 to spread successive layers of the unbound powder 204 across the powder bed 220. The powder bed 220 may have a maximum number of layers defined by the print box 214.

The nozzle 218 and the printing mechanism 219 may be movable (e.g., in coordination with one another and, optionally, in coordination with movement of the spreading mechanism 215) across the powder bed 220 to form a plurality of layers and, ultimately, to form the sacrificial component 224 and the part 210. The spreading mechanism 215, nozzle 218, and printing mechanism 219 may be movable over the print box 214. It should be understood that any manner and form of relative movement of components of the additive manufacturing system 250 may be used to carry out any one or more of the binder jetting processes described herein. Thus, for example, the print box 214 may be, further or instead, movable with respect to one or more of the spreading mechanism 215, nozzle 218, and printing mechanism 219 to achieve relative movement of components, as necessary to carry out any one or more of the binder jetting processes described herein.

The spreading mechanism 215 may generally span at least one dimension of the powder bed 220 such that the spreading mechanism 215 may distribute a layer of the unbound powder 204 on top of the powder bed 220 in a single pass. As an example, the spreading mechanism 215 may include a roller rotatable about an axis perpendicular to an axis of movement of the spreading mechanism 215 across the print box 214.

The roller may be, for example, substantially cylindrical. In use, rotation of the roller about the axis perpendicular to the axis of movement of the spreading mechanism 215 may spread the unbound powder 204 that flows from the powder supply 217 to the print box 214 to form a layer of the unbound powder 204 of the powder bed 220. It should be appreciated, therefore, that the plurality of sequential layers of the unbound powder 204 of the powder bed 220 may be formed through repeated movement of the spreading mechanism 215 across the powder bed 220. The thickness of each layer of the unbound powder 204 may be substantially uniform and, in particular, may be about 50 microns. Other dimensions are additionally or alternatively possible.

The printing mechanism 219 may direct binder fluid into the powder bed 220 as the printing mechanism 219 moves across the powder bed 220. While the printing mechanism 219 may be illustrated as a single printhead, it should be appreciated that the printing mechanism 219 may, additionally or alternatively, include a plurality of printheads from which the binder fluid 222 may be jetted into the powder bed 220. Further, it should be understood that jetting of the binder fluid 222 into the unbound powder 204 of the powder bed may be jetted from any direction.

The controller 230 may be in electrical communication with the powder supply 217, build platform 213, print box 214, spreading mechanism 215, printing mechanism 219, and nozzle 218 to drive functionality of same. The controller 230 may include one or more processors 231 operable to control the powder supply 217, build platform 213, print box 214, spreading mechanism 215, printing mechanism 219, and nozzle 218, and combinations thereof.

The one or more processors 231 of the controller 230 may execute instructions to control movement of one or more of the powder supply 217, build platform 213, print box 214, spreading mechanism 215, printing mechanism 219, and nozzle 218 relative to one another as the sacrificial component 224 and the part 210 are being formed. For example, the one or more processors 231 of the controller 230 may execute instructions to move the powder supply 217 to direct the unbound powder 204 toward powder bed 220, move the spreading mechanism 215 to spread the unbound powder 204 across the powder bed, move the printing mechanism 219 to jet binder fluid into a layer of unbound powder of the powder bed, and to move the build platform 213 in a z-axis direction away from the spreading mechanism 215 to accept each new layer of the powder 204 along the top of the powder bed 220 as the spreading mechanism 215 moves across the powder bed 220. In general, the controlled movement of the build platform 213 is based on a thickness of a corresponding layer being formed in the powder bed 220.

Additionally, or alternatively, the one or more processors 231 of the controller 230 may execute instructions to control movement of the spreading mechanism 215 to spread successive layers of the unbound powder 204 across the powder bed 220. For example, the one or more processors 231 of the controller 230 may control speed of movement of the spreading mechanism 215 across the powder bed 220. As a further or alternative example, the controller 230 may control one or more features of the spreading mechanism 215 useful for packing the top layer of the powder bed 220 as the spreading mechanism 215 moves across the powder bed 220. Returning to the specific example of the spreading mechanism 215 being rotatable, the one or more processors 231 of the controller 230 may control rotation (e.g., speed, direction, or both) of the spreading mechanism 215.

The one or more processors 231 of the controller 230 may, further or instead, control the printing mechanism 219. For example, the one or more processors 231 of the controller 230 may control movement (e.g., speed, direction, timing, and combinations thereof) of the printing mechanism 219 across the powder bed 220 as well as jetting of the binder fluid 222 from the printing mechanism 219 into unbound powder of the powder bed 220. The one or more processors 231 may control the printing mechanism 219 to jet the binder fluid 222 into unbound powder of the powder bed 220 along a controlled two-dimensional pattern associated with a given layer. The controlled two-dimensional pattern may vary from layer-to-layer, as necessary, according to a component shape of sacrificial component 224 and a part shape of the part 210 being formed in the powder bed 220.

The additive manufacturing system 250 may further, or instead, include a non-transitory, computer readable storage medium 232 in communication with the controller 230 and having stored thereon a three-dimensional model(s) 234 and instructions for causing the one or more processors 231 to carry out any one or more of the methods described herein. In general, as a plurality of sequential layers of the powder unbound powder 204 are introduced to the powder bed 220, the sacrificial component 224 and the part 210 are formed according to the three-dimensional model(s) 234 stored in the non-transitory, computer readable storage medium 232. In certain implementations, the controller 230 may retrieve the three-dimensional model(s) 234 in response to user input, and generate machine-ready instructions for execution by the additive manufacturing system 250 to fabricate the sacrificial component 224 and the part 210.

In the example embodiment of FIG. 2A, at least a portion of the part 210 is printed above the sacrificial component 224 and is coupled to the sacrificial component 224 via a mechanical coupling 205 that may be an indirect or direct mechanical coupling, as disclosed herein. The controller 230 may be further configured to drive the printing mechanism 219 to print the at least a portion of the part above the sacrificial component 224.

According to an embodiment, the part 210 and the sacrificial component 224 may be coupled in the coupled arrangement 226 via an indirect mechanical coupling formed of the unbound powder 204. According to another embodiment, the part 210 and the sacrificial component 224 may be coupled in the coupled arrangement 226 via a direct mechanical coupling. For example, the controller 230 may be further configured to form the direct mechanical coupling by driving the spreading mechanism 215 to spread one or more layers of the unbound powder 204 and driving the printing mechanism 219 to jet the binder fluid 222 into same in a manner that creates a lattice connection, such as the lattice structure 1121 of FIG. 11A, disclosed further below, that may be created between the at least a portion of the part and the sacrificial component.

The controller 230 may be further configured to drive the printing mechanism 219 to print at least a portion of the part 210 above the sacrificial component. The part 210 and the sacrificial component 224 may be coupled in the coupled arrangement via a direct mechanical coupling formed of an anti-sintering agent (ASA), as disclosed further below with reference to FIG. 7B. The controller 230 may be further configured to drive the printing mechanism 219 to apply the ASA to a surface of the sacrificial component 224 to form a separation layer between the at least a portion of the part 210 and the sacrificial component 224 and drive the sintering mechanism (not shown) to sinter the coupled arrangement 226 to decouple the at least a portion of the part 210 from the sacrificial component 224.

According to an example embodiment, the controller 230 may be further configured to drive the printing mechanism 219 to print at least a portion of the part 210 above the sacrificial component 224 and the at least a portion of the part 210 may be the entire part.

According to an example embodiment, the controller 230 may be further configured to: drive the printing mechanism 219 to print the sacrificial component 224 with a component shape that extends laterally beyond a part shape of the part 210; print one or more layers of the sacrificial component 224 and the part 210 that extend the sacrificial component 224 and the part 210 vertically upward and alongside each other; or a combination thereof, such as disclosed below with reference to FIG. 8B and FIG. 8C.

According to an example embodiment, the controller 230 may be further configured to drive the printing mechanism 219 to create the sacrificial component 224 with one or more gaps of the unbound powder 204 to facilitate decoupling of the sacrificial component 224 from the part 210, such as disclosed further below with reference to FIG. 8D.

According to an example embodiment, the controller 230 may be further configured to drive the printing mechanism 219 to jet the binder fluid 222 into the unbound powder 204 in a manner that prints the sacrificial component 224 as a lattice structure, such as the lattice structure 224, disclosed further below with reference to FIG. 11A.

According to an example embodiment, the controller 230 may be further configured to drive the printing mechanism 219 to print the sacrificial component 224 as multiple sacrificial components each having a direct or indirect mechanical coupling with a respective sacrificial component-facing surface of the part, such as disclosed below with reference to FIG. 12.

According to an example embodiment, the part 210 may have a part shape and the controller 230 may be further configured to drive the printing mechanism 219 to print the sacrificial component 224 with a complementary shape relative to the part shape. The complementary shape may conform to a topography of the part shape at least sufficient enough to provide for the coupled arrangement.

According to an example embodiment, the controller 230 may be further configured execute instructions or interpret codes that were generated according to the 3D CAD model(s) 234 to drive the printing mechanism 219 to print the sacrificial component 224 and the part 210 in the coupled arrangement 226.

According to an example embodiment, the controller 230 may be further configured to drive the printing mechanism 219 to: print the sacrificial component 224 by jetting the binder fluid 222 at a first saturation level; and print the part 210 by jetting the binder fluid 222 at a second saturation level, wherein the first saturation level may be lower relative to the second saturation level, such as disclosed further below with reference to FIGS. 15A-D.

Figure 2B:
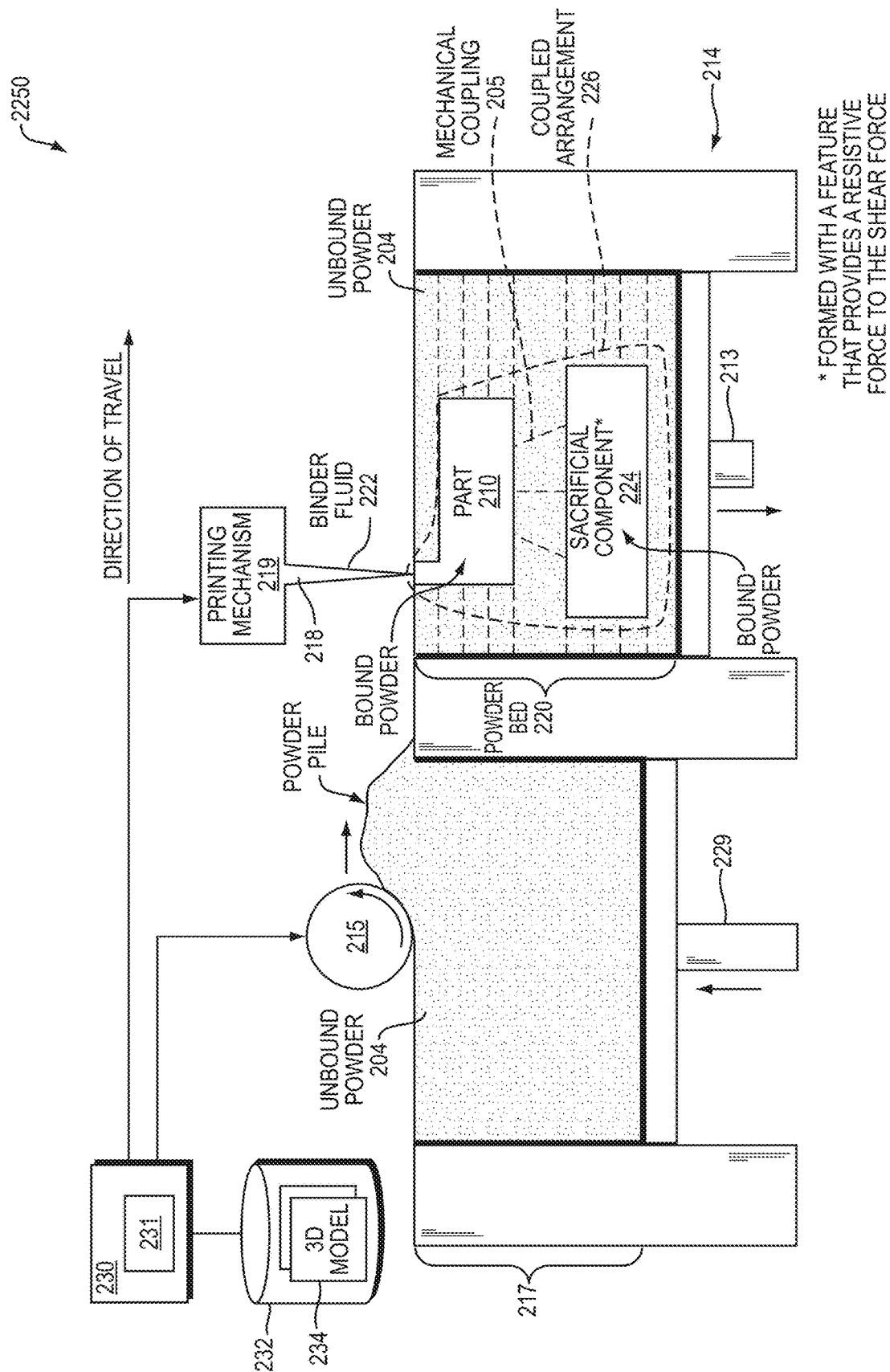
FIG. 2B is a block diagram of an example embodiment of another additive manufacturing system.

FIG. 2B is a block diagram of another example embodiment of an additive manufacturing system 2250. The example embodiment of the additive manufacturing system 2250 includes an alternative embodiment of the powder supply 217 relative to the example embodiment of the additive manufacturing system 250 of FIG. 2A, disclosed above.

According to the example embodiment, the print box 214 includes the powder supply 217 for depositing the pile of unbound powder 204. As in the example embodiment of FIG. 2A, disclosed above, the pile of unbound powder 204 may then be spread, rolled, smoothed, or compacted by means of the spreading mechanism 215, such as a counter-rotating roller, doctor blade, or other means for spreading.

According to the example embodiment of FIG. 2B, the spreading mechanism 215 may be movable from the powder supply 217 to the powder bed 220 and along the powder bed 220 to spread successive layers of the unbound powder 204 across the powder bed 220. As in the example embodiment of FIG. 2A, disclosed above, the nozzle 218 and the printing mechanism 219 may be movable (e.g., in coordination with one another and, optionally, in coordination with movement of the spreading mechanism 215) across the powder bed 220 to form a plurality of layers and, ultimately, to form the sacrificial component 224 and the part 210.

According to the example embodiment of FIG. 2B, the one or more processors 231 of the controller 230 may execute instructions to control z-axis movement of one or more of the powder supply 217 and the build platform 213 relative to one another as the sacrificial component 224 and the part 210 are being formed. For example, the one or more processors 231 of the controller 230 may execute instructions to move the powder supply 217 in a z-axis direction toward the spreading mechanism 215 to direct the unbound powder 204 toward the spreading mechanism 215 as each layer is formed and to move the build platform 213 in a z-axis direction away from the spreading mechanism 215 to accept each new layer of the unbound powder 204 along the top of the powder bed 220 as the spreading mechanism 215 moves across the powder bed 220. Movement of the powder supply 217 may be performed by driving movement of a powder supply platform 229. The powder supply platform may be any suitable moveable platform, such as a piston.

In general, the controlled movement of the build platform 213 relative to the powder supply 217 is based on a thickness of a corresponding layer being formed in the powder bed 220. Movement of the powder supply 217 may be upward via a powder supply platform Additionally, or alternatively, the one or more processors 231 of the controller 230 may execute instructions to control movement of the spreading mechanism 215 from the powder supply 217 to the powder bed 220 to spread successive layers of the unbound powder 204 across the powder bed 220.

Figure 3:
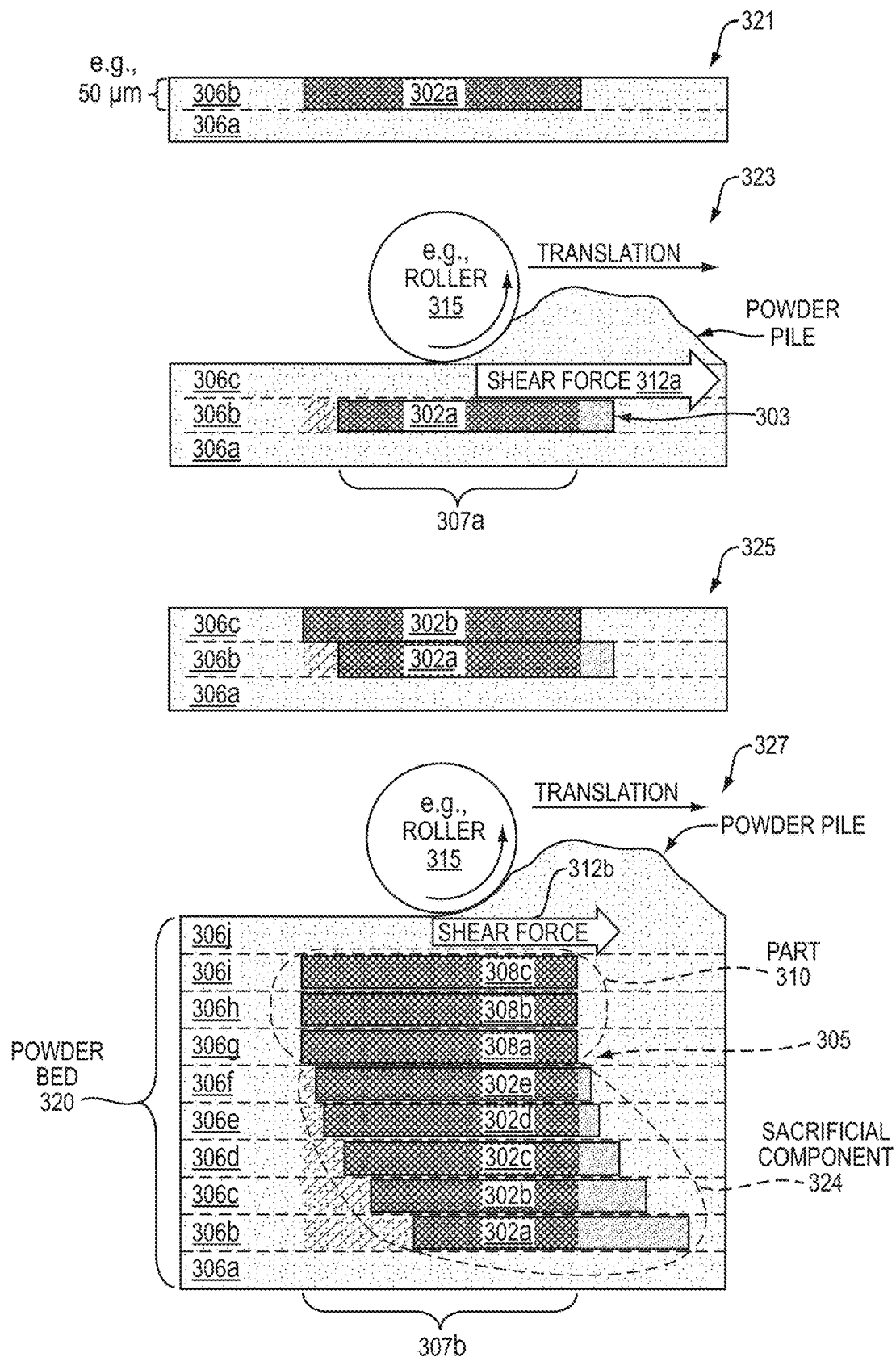
FIG. 3 is a block diagram of an example embodiment of printing stages for printing a sacrificial component and a part.

FIG. 3 is a block diagram of an example embodiment of printing stages for printing a sacrificial component 324 and a part 310 in a coupled arrangement. In a first printing stage 321, a first printed layer 302a of the sacrificial component 324 is printed by jetting binder fluid into unbound powder of the powder bed layer 306b spread on top of the unbound powder of the powder bed layer 306a of a powder bed 320.

In a second printing stage 323, a next layer of unbound powder is spread across a current top surface of the powder bed 320, where the current top surface in the second printing stage 323 is the powder bed layer 306b that includes the printed layer 302a of the sacrificial component 324 and unbound powder. A spreading mechanism 315, such as a roller or any other suitable spreading mechanism, is used to spread the unbound powder of the powder bed layer 306c across the current top surface of the powder bed 320 and applies a shear force 312a during the spreading. In response to the shear force 312a, the printed layer 302a shifts 303 relative to its original printed location 307a. As such, the shear force 312a from the spreading mechanism 315 causes the previously printed layer, that is, the printed layer 302a of the sacrificial component 324, to shift relative to its original printed location 307a.

In a third printing stage 325, binder fluid is jetted into unbound powder of the powder bed layer 306c to form a next printed layer of the sacrificial component 324, that is, the printed layer 302b. The powder bed layer 306c includes the printed layer 302b of the sacrificial component 324 and unbound powder and becomes the current top surface layer of the powder bed 320.

In a fourth printing stage 327, additional layers of the sacrificial component 324 are printed, namely the printed layers 302c, 302d, and 302e, by spreading unbound powder to successively form the powder bed layers 306d, 306e, and 306f and jetting binder fluid into same. Following the printing of a given number of layers of the sacrificial component 324, that is, five in the example embodiment, a feature of the sacrificial component 324 is formed that provides a resistive force to the shear force imposed by the spreading mechanism 315 during spreading. Additional layers of unbound powder are spread to form additional powder bed layers of the powder bed 320, namely, the powder bed layers 306g, 306h, and 306i, and binder fluid is jetted into same to print the printed layers 308a, 308b, and 308c of the part 310.

As disclosed in FIG. 3, there is no shifting of the printed layers 308a, 308b, and 308c of the part 310, relative to an original printed location 307b, due to the shear force 312b imposed by the spreading mechanism 315 during spreading of unbound powder above such layers. Shifting due to the shear force 312b is limited to the five printed layers of the sacrificial component 324. The five printed layers of the sacrificial component 324 serve as an anchor for printed layers of the part 310 and form a feature of the sacrificial component 324 that provides a resistive force to the shear force imposed by the spreading mechanism during spreading of unbound powder. As disclosed in the example embodiment of FIG. 3, at least a portion of the part 310 is above the sacrificial component 324 in the coupled arrangement. In the example embodiment, the mechanical coupling 305 between the part 310 and the sacrificial component 324 is a direct mechanical coupling.

The five printed layers 306b-f of the sacrificial component 324 are lower in the powder bed relative to the printed layers 308a-c. The coupled arrangement of the part 310 and the sacrificial component 324 in combination with the resistive force provided by at least the given number of layers, that is, the five printed layers 306b-f of the sacrificial component 324, is sufficient to immobilize each printed layer of the part 310 in the powder bed 320, that is, the printed layers 308a-c, to resist the shear force 312b imposed by the spreading mechanism 315 during spreading of unbound powder above each printed layer of the part 310.

Figure 4:
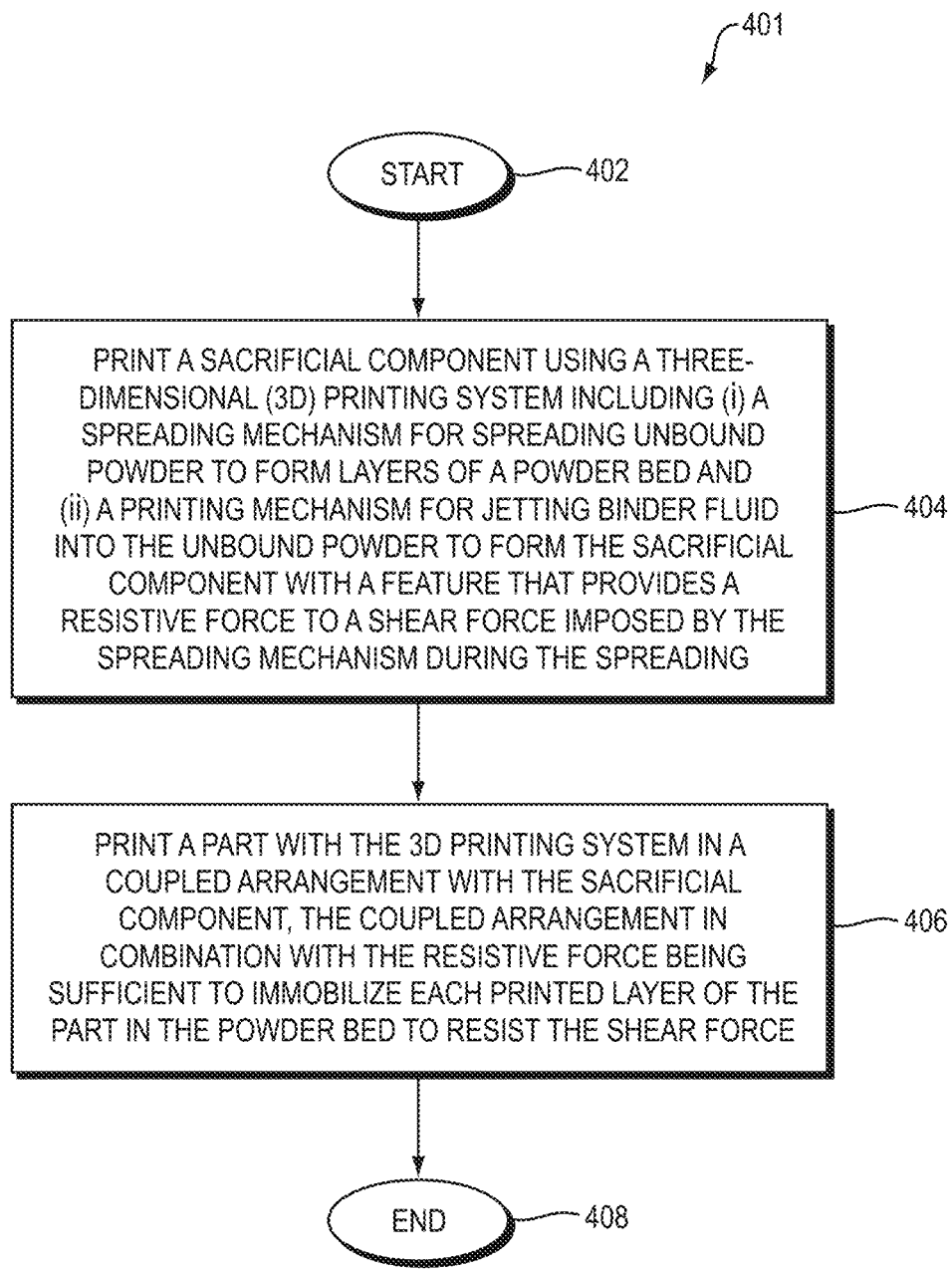
FIG. 4 is a flow diagram of an example embodiment of an additive manufacturing method.

FIG. 4 is a flow diagram 401 of an example embodiment of an additive manufacturing method. The method begins (402) and prints a sacrificial component using a three-dimensional (3D) printing system including (i) a spreading mechanism for spreading unbound powder to form layers of a powder bed and (ii) a printing mechanism for jetting binder fluid into the unbound powder to form the sacrificial component with a feature that provides a resistive force to a shear force imposed by the spreading mechanism during the spreading (404). The method prints a part with the 3D printing system in a coupled arrangement with the sacrificial component, the coupled arrangement in combination with the resistive force being sufficient to immobilize each printed layer of the part in the powder bed to resist the shear force imposed by the spreading mechanism during spreading of the unbound powder above each printed layer of the part (406), and the method thereafter ends (408) in the example embodiment.

Figure 5A:
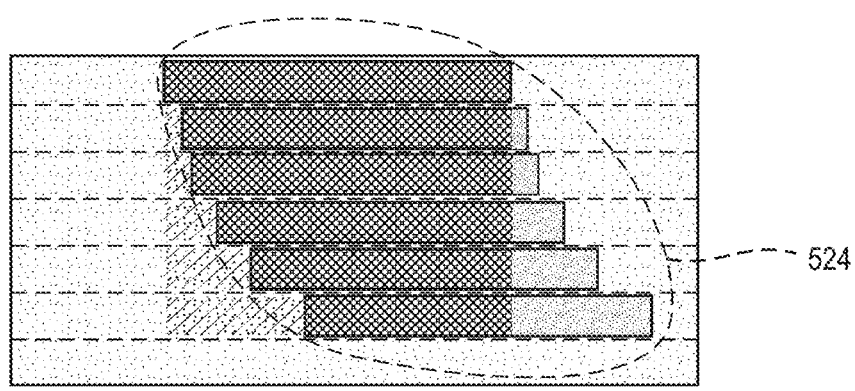
FIG. 5A is a block diagram of an example embodiment of a sacrificial component.

FIG. 5A is a block diagram of an example embodiment of a sacrificial component 524. In the example embodiment, shifting is present in lower layers of the sacrificial component 524 referred to interchangeably herein as a raft.

Figure 5B:
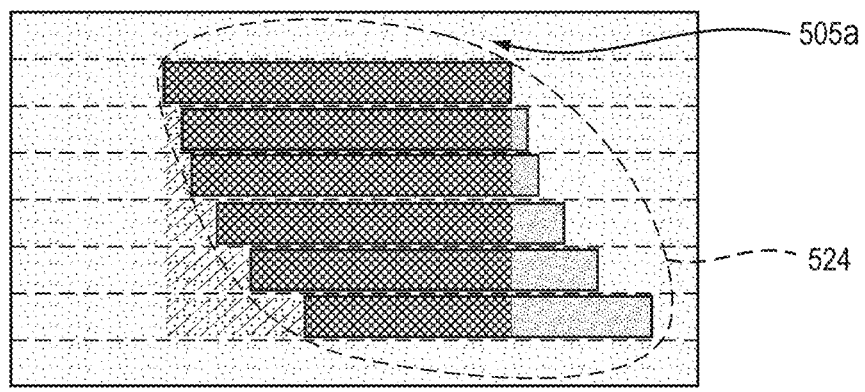
FIG. 5B is a block diagram of the sacrificial component of FIG. 5A with a layer of unbound powder above the sacrificial component.

FIG. 5B is a block diagram of the sacrificial component 524 of FIG. 5A with a layer 505a of unbound powder spread above the sacrificial component 524. The layer 505a of unbound powder may serve as an indirect mechanical coupling between the sacrificial component 524 and a printed layer of the part (not shown) that is printed above the layer 505a of unbound powder.

Figure 5C:
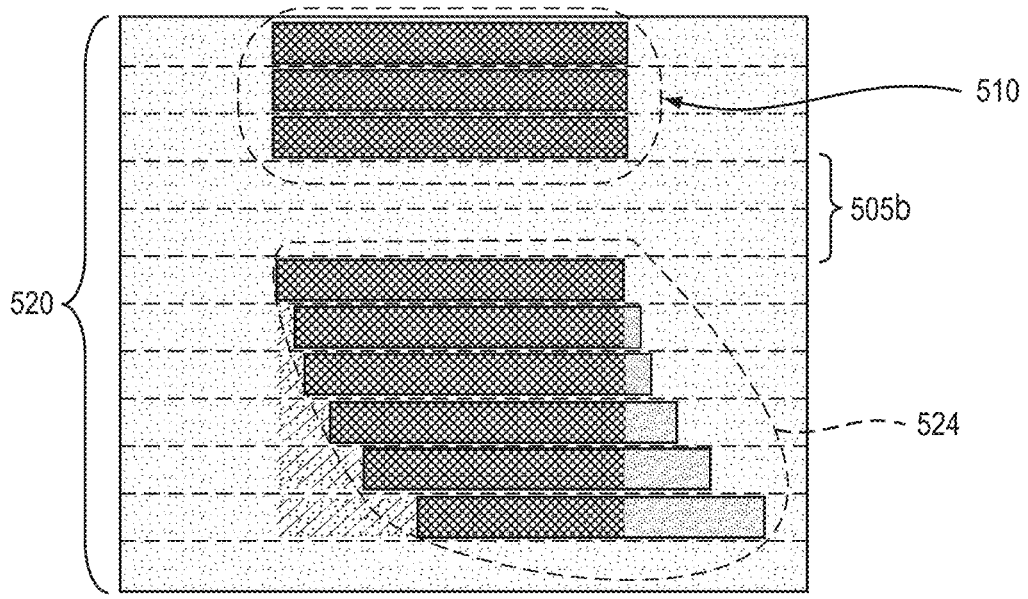
FIG. 5C is a block diagram of the sacrificial component of FIG. 5A with multiple layers of unbound powder located between the sacrificial component and the part within a powder bed.

FIG. 5C is a block diagram of the sacrificial component 524 of FIG. 5A with multiple layers of unbound powder 505b located between the sacrificial component 524 and the part 510 within a powder bed 520. The multiple layers of unbound powder 505b may serve as an indirect mechanical coupling between the sacrificial component 524 and the part 510. The part 510 is printed in a coupled arrangement with the sacrificial component 524 and, in the coupled arrangement, the sacrificial component 524 (i.e., "raft") is printed underneath the part 510, and any smearing or layer shifting occurs on the sacrificial component 524. After the raft is at least some number of layers in thickness (at least one layer, preferably at least 10 layers, most preferably at least 30 layers), the raft has been formed with a feature that provides a resistive force to a shear force imposed by a spreading mechanism (not shown) during spreading. Subsequently, in the example embodiment, at least one layer of powder, such as the layers 505a or 505b, may be spread without binder (preferably between one layer and 20 layers, more preferably between 2 and 10 layers, most preferably between 3-5 layers of powder), followed by printing of the part 510.

Figure 6A:
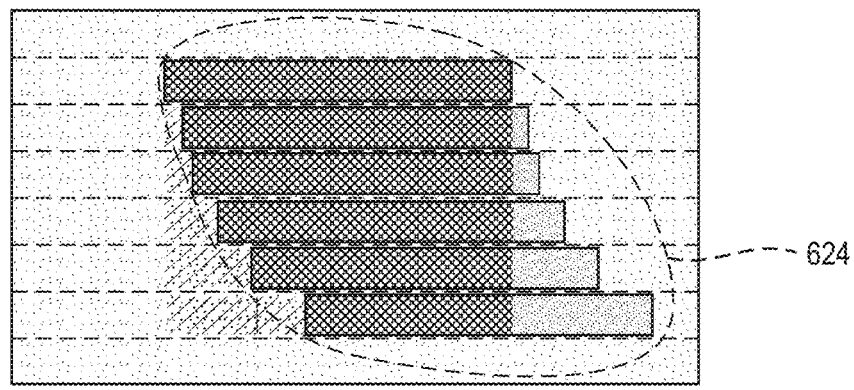
FIG. 6A is a block diagram of another example embodiment of a sacrificial component.

FIG. 6A is a block diagram of another example embodiment of a sacrificial component 624. In the example embodiment, shifting is present in lower layers of the sacrificial component referred to interchangeably herein as a raft.

Figure 6B:
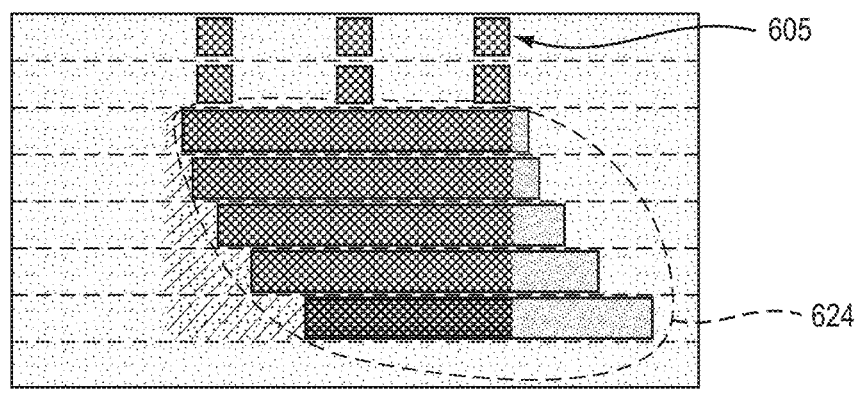
FIG. 6B is a block diagram of the sacrificial component of FIG. 6A with a thin lattice structure printed above the sacrificial component.

FIG. 6B is a block diagram of the sacrificial component 624 of FIG. 6A with a thin lattice structure 605 printed above the sacrificial component 624. The lattice structure 605 may serve as a direct mechanical coupling between the sacrificial component 624 and a printed layer of the part (not shown) that is printed above the lattice structure 605.

Figure 6C:
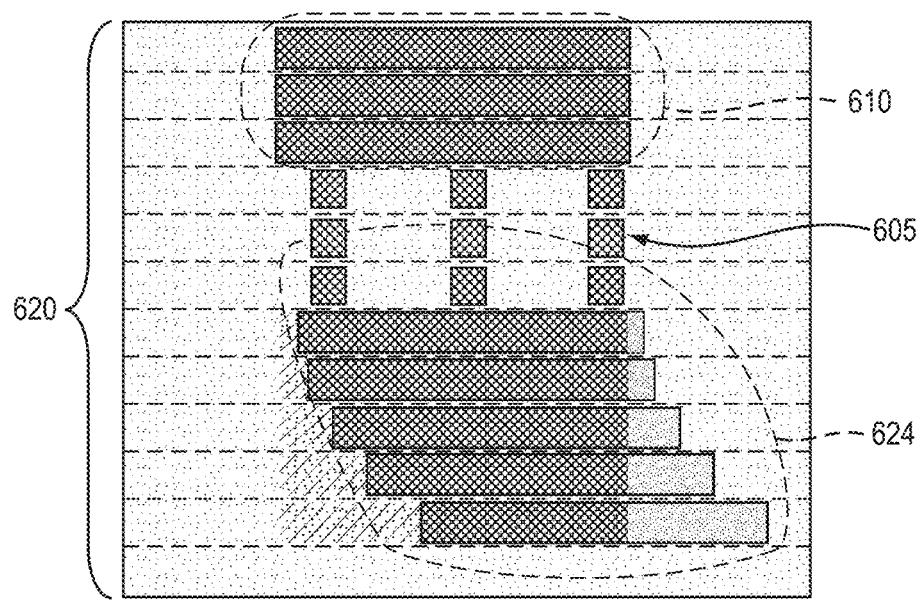
FIG. 6C is a block diagram of a part printed in a coupled arrangement with a sacrificial component.

FIG. 6C is a block diagram of a part 610 printed in a coupled arrangement with a sacrificial component 624. The sacrificial component 624 is formed with a feature that provides a resistive force to a shear force imposed by a spreading mechanism (not shown). After the raft is at least some number of layers in thickness (at least one layer, preferably at least 10 layers, most preferably at least 30 layers), the feature is formed, and a tenuous connection, that is, the lattice structure 605, is printed between the raft and the bottom of the part, in the example embodiment. The printed part 610 is coupled to the sacrificial component 624 by the thin lattice structure 605 that is printed above the sacrificial component 624 in the coupled arrangement. The coupled arrangement in combination with the resistive force, locks the printed part 610 in place in the powder bed 620 and the part 610 is free from shifting and any smearing or layer shifting occurs on the sacrificial component 624.

Figure 7A:
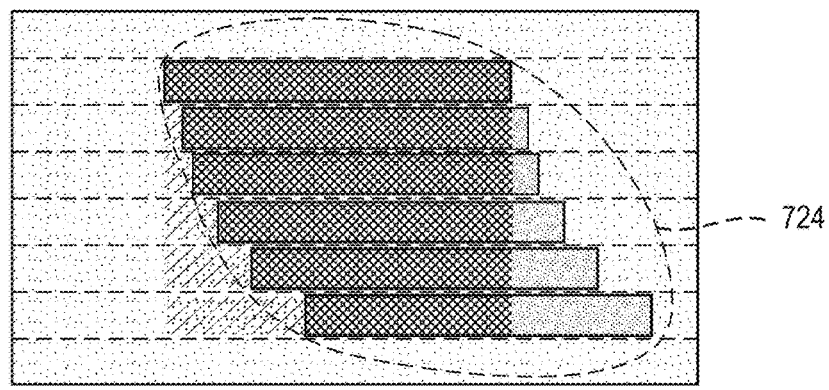
FIG. 7A is a block diagram of an example embodiment of another sacrificial component.

FIG. 7A is a block diagram of an example embodiment of another sacrificial component 724. In the example embodiment, shifting is present in lower layers of the sacrificial component 724 referred to interchangeably herein as a raft.

Figure 7B:
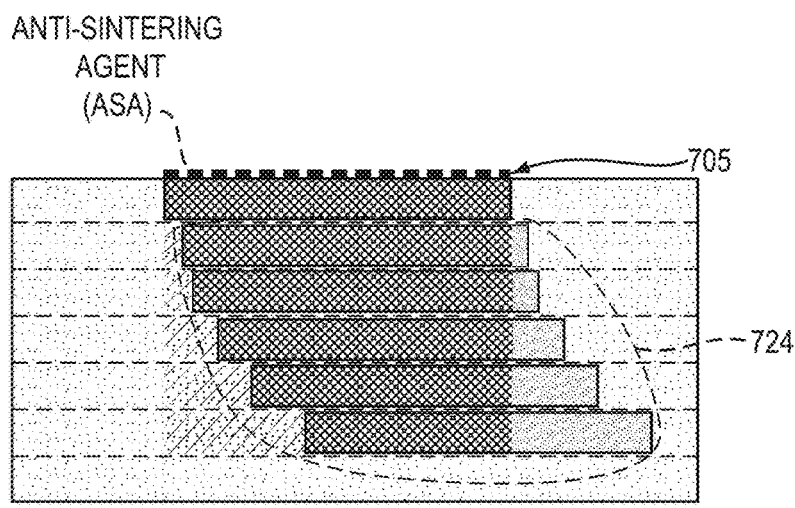
FIG. 7B is a block diagram of the sacrificial component of FIG. 7A with an anti-sintering agent (ASA) applied to a top surface of the sacrificial component.

FIG. 7B is a block diagram of the sacrificial component 724 of FIG. 7A with an anti-sintering agent (ASA) applied to the top surface 705 of the sacrificial component 724 to form a sinter-resistant layer. The top surface 705 of the sacrificial component 724 may serve as a direct mechanical coupling between the sacrificial component 724 and a printed layer of the part (not shown) that is printed above the top surface 705 having the ASA applied. The ASA may include a material that is less sinterable than at least a portion of the particles of the unbound powder with binder fluid jetted into same. The ASA may be miscible with the binder fluid and applied in combination with jetting of the binder fluid to print the top surface 705. The ASA may be employed to introduce an area of weakness that is useful for separating the part (not shown) that is printed in the coupled arrangement with the sacrificial component 724 after sintering.

Other suitable techniques for forming a sinter-resistant layer on a sinterable three-dimensional object are described by way of non-limiting examples, in Khoshnevis, et al, "Metallic part fabrication using selective inhibition sintering (SIS)," Rapid Prototyping Journal, Vol. 18:2, pp. 144-153 (2012) and U.S. Pat. No. 7,291,242 to Khoshnevis, each of which is hereby incorporated by reference in its entirety. By way of non-limiting example, suitable techniques for inhibiting sintering on a surface of an object include the use of a ceramic as a macroscopic mechanical inhibitor, an application of lithium chlorate and aluminum sulfate as microscopic mechanical inhibitors, and an application of sulfuric acid and hydrogen peroxide as chemical inhibitors. More generally, any technique for mechanically, chemically or otherwise inhibiting sintering may be usefully employed to form the sinter-resistant layer to facilitate post-sintering separation of the part and the sacrificial component 724.

Figure 7C:
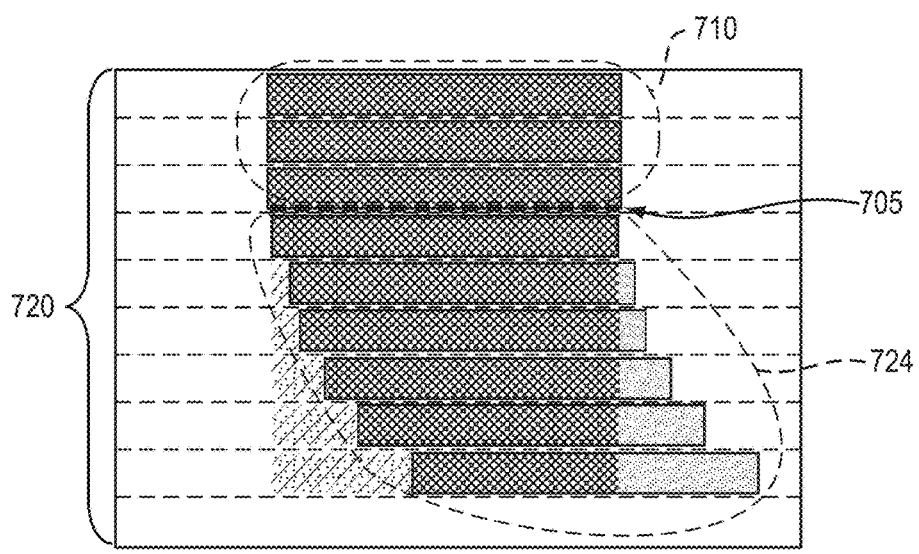
FIG. 7C is a block diagram of another example embodiment of a part printed in a coupled arrangement with a sacrificial component.

FIG. 7C is a block diagram of another example embodiment of a part 710 printed in a coupled arrangement with a sacrificial component 724. In the coupled arrangement of the example embodiment, the sacrificial component 724 is printed underneath the part 710. The sacrificial component 724 is formed with a feature that provides a resistive force to a shear force imposed by a spreading mechanism (not shown). After the sacrificial component 724 is at least some number of layers in thickness (at least one layer, preferably at least 10 layers, most preferably at least 30 layers), the feature is formed, an ASA is applied to the top surface 705 of the sacrificial component 724, and the part is printed. The ASA forms a direct mechanical coupling between the part 710 and the sacrificial component 724, in the example embodiment. The coupled arrangement in combination with the resistive force, locks the printed part 710 in place in the powder bed 720 and the part 710 is free from shifting and any smearing or layer shifting occurs on the sacrificial component 724.

FIGS. 8A-D, disclosed below, disclose example embodiments of coupled arrangements of parts and sacrificial components.

Figure 8A:
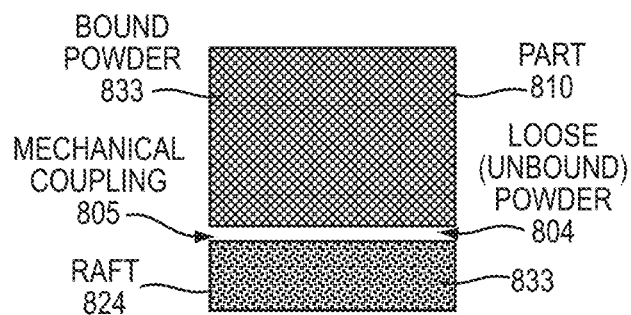
FIGS. 8A-D disclose example embodiments of coupled arrangements of parts and sacrificial components.

FIG. 8A is a block diagram of an example embodiment of a coupled arrangement of a part 810 and a sacrificial component 824. In the example embodiment, the sacrificial component 824 (i.e., raft) is under the part 810 and separated from the part 810 by an indirect mechanical coupling 805 formed of a layer of loose (i.e., unbound) powder 804. In the example embodiment, at least a portion of the part 810 is printed above the sacrificial component 824 and the at least a portion is the entire part 810. The sacrificial component and the part 810 are printed parts, that is, formed of bound powder 833.

Figure 8B:
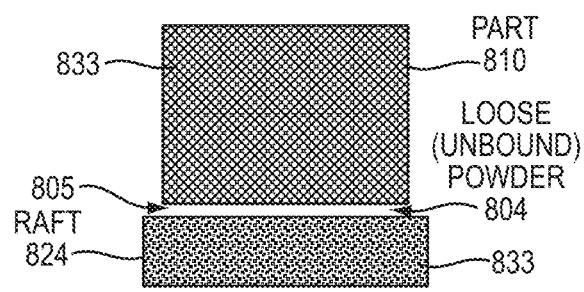

FIG. 8B is a block diagram of an example embodiment of a coupled arrangement of a part 810 and a sacrificial component 824. In the example embodiment, the sacrificial component 824 (i.e., raft) is under the part 810 and separated from the part 810 by an indirect mechanical coupling 805 formed of a layer of loose (i.e., unbound) powder 804. At least a portion of the part 810 is printed above the sacrificial component 824 and the sacrificial component 824 is printed with a component shape that extends laterally beyond a part shape of the part 810.

Figure 8C:
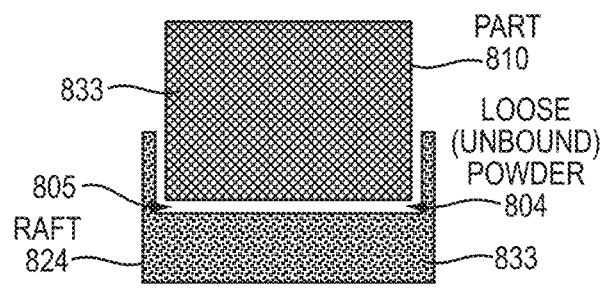

FIG. 8C is a block diagram of an example embodiment of a coupled arrangement of a part 810 and a sacrificial component 824. In the example embodiment, the sacrificial component 824 (i.e., raft) is under the part 810 and separated from the part 810 by an indirect mechanical coupling 805 formed of a layer of loose (i.e., unbound) powder 804. At least a portion of the part 810 is printed above the sacrificial component 824 and the sacrificial component 824 is printed with a component shape that extends laterally beyond a part shape of the part 810. One or more layers of the sacrificial component 824 and the part 810 extend vertically upward and alongside each other.

Figure 8D:
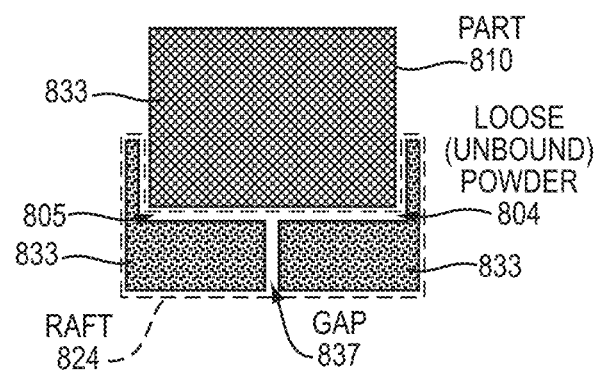
Figure 9A:
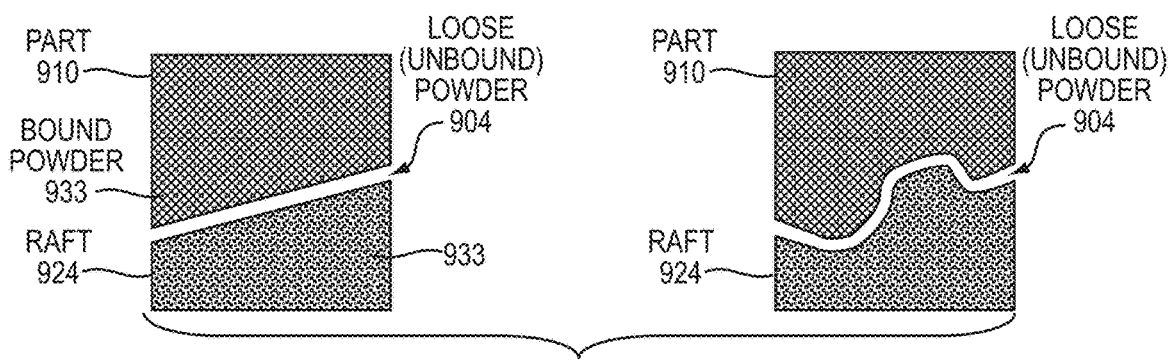
FIGS. 9A-D disclose example embodiments of various geometries for the sacrificial component of the coupled arrangements disclosed in FIGS. 8A-D.
Figure 9B:
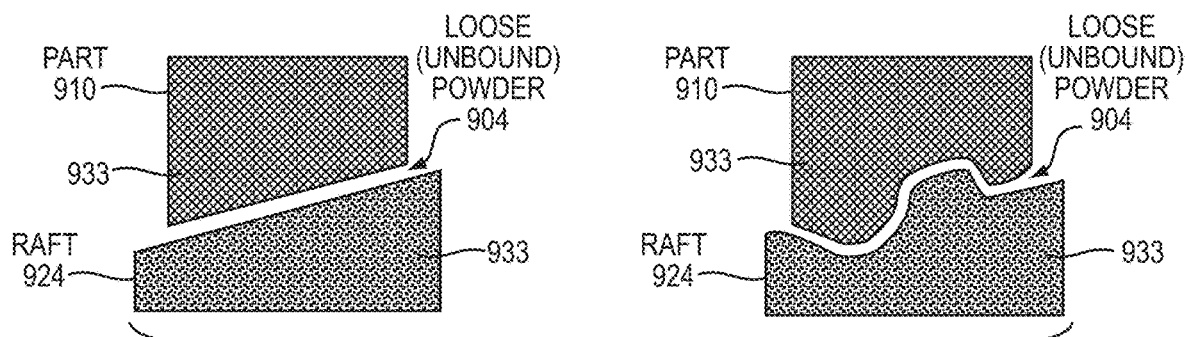
Figure 9C:
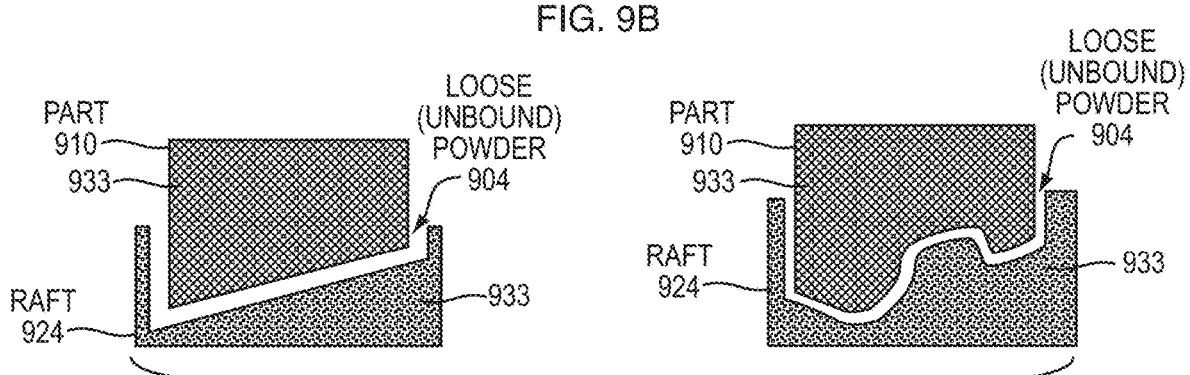
Figure 9D:
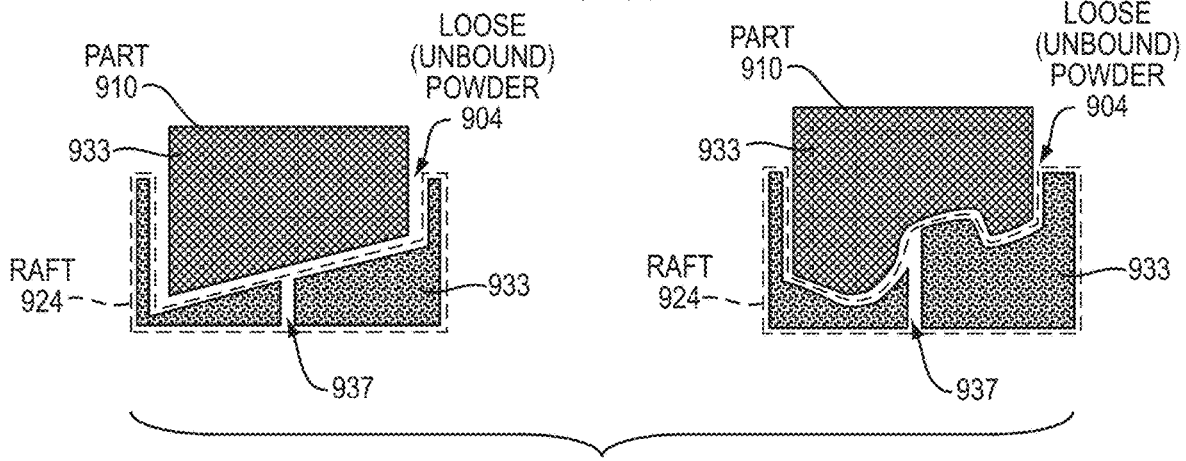

FIG. 8D is a block diagram of an example embodiment of a coupled arrangement of a part 810 and a sacrificial component 824. In the example embodiment, a sacrificial component 824 (i.e., raft) is under the part 810 and separated from the part 810 by an indirect mechanical coupling 805 formed of a layer of loose (i.e., unbound) powder 804. The sacrificial component 824 is created with a gap 837 of the unbound powder 804 to facilitate decoupling of the sacrificial component 824 from the part 810. The gap 837 may be referred to interchangeably herein as a "split." The sacrificial component 824 and the part 810 are printed parts formed of the bound powder 833.

FIGS. 9A-D disclose example embodiments of various geometries for the sacrificial component of the coupled arrangements disclosed above in FIGS. 8A-D. The example embodiment of FIGS. 9A-D illustrate arbitrary shapes for the sacrificial component (i.e., raft) 924 that follow a surface topology of the part 910. The sacrificial component 924 and the part 910 are printed parts formed of the bound powder 933. An indirect mechanical coupling formed of the unbound powder 904 is created between the sacrificial component 924 and the part 910. As in the example embodiment of FIG. 8D, disclosed above, in the example embodiment of FIG. 9D, there is a gap 937 in the sacrificial component 924.

It should be understood that the example embodiments of FIGS. 8A-9D may be combined with an ASA layer between the sacrificial component and the part, such as disclosed with reference to FIG. 7B and FIG. 7C, above.

Figure 10A:
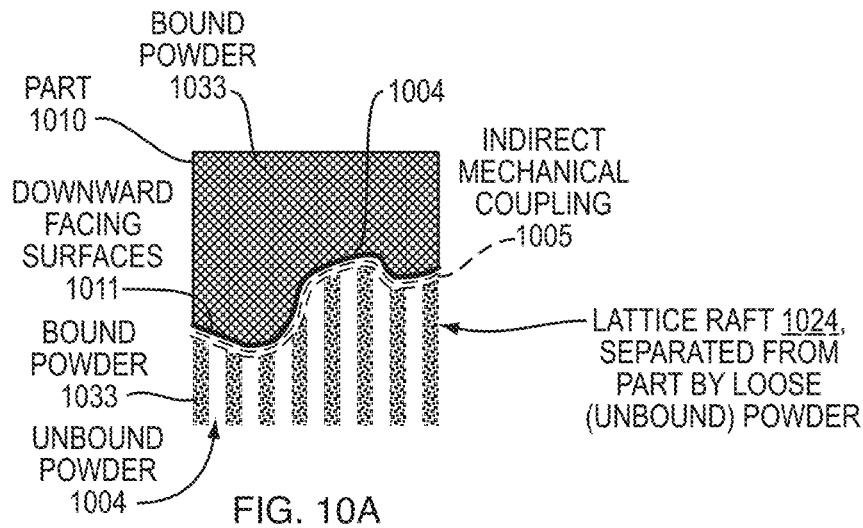
FIG. 10A is a block diagram of an example embodiment of a part and a sacrificial component printed as a lattice structure.

FIG. 10A is a block diagram of an example embodiment of a part 1010 and a sacrificial component 1024 printed as a lattice structure. The part 1010 has multiple downward-facing surfaces 1011. In the example embodiment, the part 1010 and the sacrificial component 1024 are printed in a coupled arrangement. The part 1010 and the sacrificial component 1024 are formed of bound powder 1033. Printing of the sacrificial component 1024 included jetting the binder fluid into the unbound powder 1004 in a manner that formed the sacrificial component 1024 as the lattice structure. The part 1010 and the sacrificial component 1024, printed as the lattice structure, are separated by an indirect mechanical coupling 1005 formed of a layer of loose (i.e., unbound) powder 1004. The lattice structure may be separated from the part 1010 by one or more layers of unbound powder (also referred to interchangeably herein as loose powder), by a layer of ASA 1039 as disclosed in FIG. 10C, below, or may be connected to the part via a direct mechanical coupling, as disclosed in FIG. 10B.

Figure 10B:
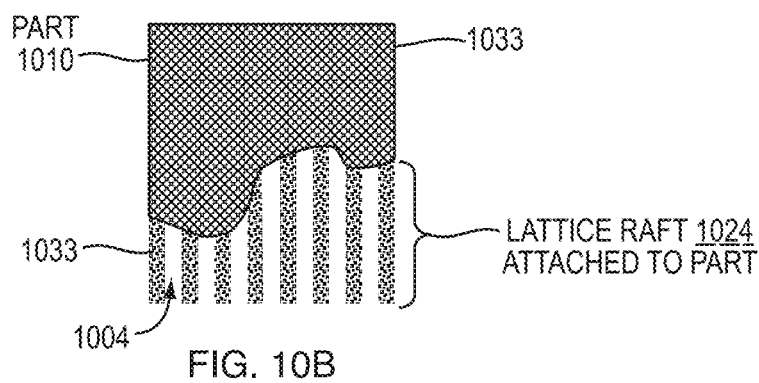
FIG. 10B is a block diagram of another example embodiment of a part and a sacrificial component printed as a lattice structure.

FIG. 10B is a block diagram of another example embodiment of a part 1010 and a sacrificial component 1024 printed as a lattice structure. In the example embodiment, the lattice structure is connected to the part 1010 via multiple direct connections that form a direct mechanical coupling between the part 1010 and the sacrificial component 1024.

Figure 10C:
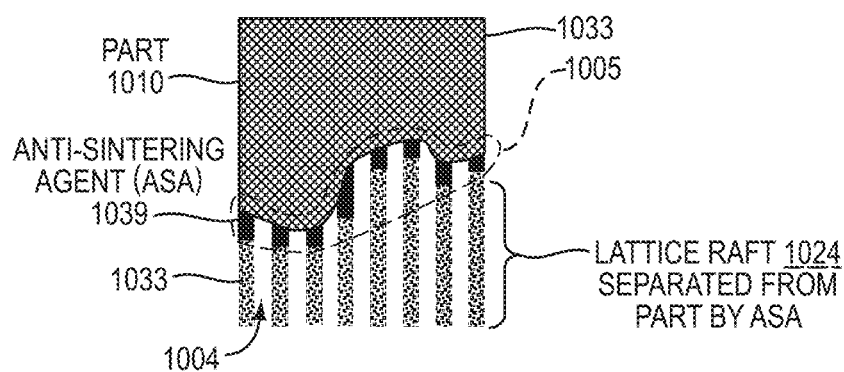
FIG. 10C is a block diagram of yet another example embodiment of a part and a sacrificial component printed as a lattice structure.

FIG. 10C is a block diagram of another example embodiment of a part 1010 and a sacrificial component 1024 printed as a lattice structure. In the example embodiment, the lattice structure is separated from the part 1010 by an ASA layer that is formed by the ASA 1039 having been applied at multiple locations of the lattice structure to form the mechanical coupling 1005 that is a direct mechanical coupling between the part 1010 and the sacrificial component 1024 in the example embodiment.

Figure 11A:
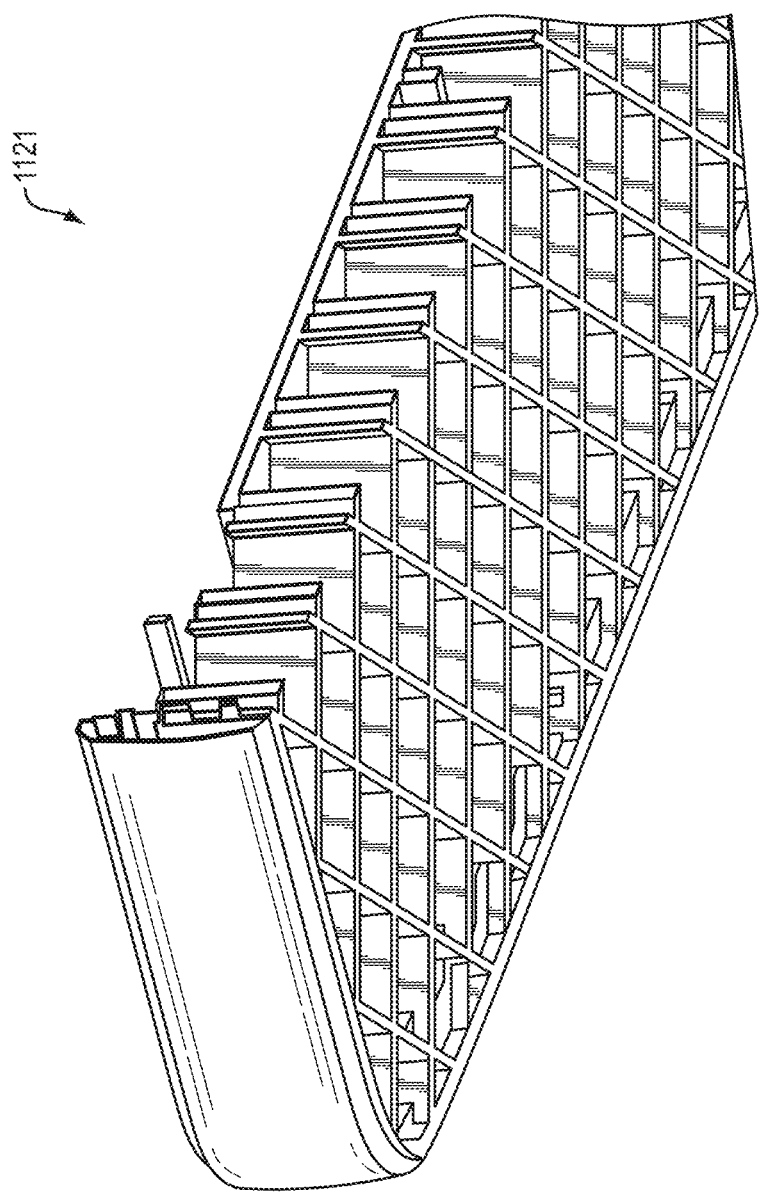
FIG. 11A is a screen view of an example embodiment of a lattice structure.

FIG. 11A is a screen view of an example embodiment of a lattice structure 1121. As disclosed above, such a lattice structure is not a contiguous body and may be employed as a sacrificial component in a coupled arrangement with a part, such as the sacrificial component 24 in the coupled arrangement 26 with the part 10 of FIG. 1A, disclosed above. Alternatively, the lattice structure 1121 may be employed as a mechanical coupling between the part and the sacrificial component, such as the mechanical coupling 5 between the part 10 and the sacrificial component 24 of FIG. 1A, disclosed above. For example, the lattice structure 1121 may be printed to form a direct mechanical coupling between a sacrificial component and part in a coupled arrangement, as disclosed above with reference to FIG. 6C.

Figure 11B:
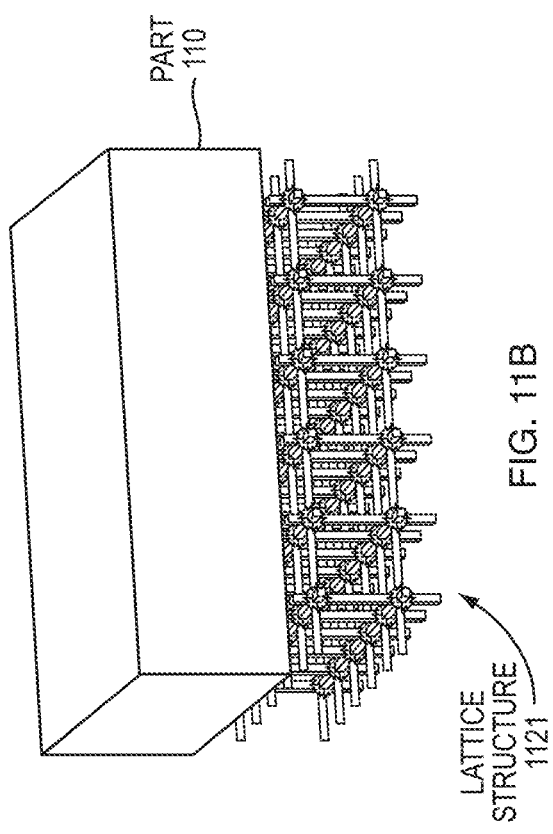
FIG. 11B is an oblique view of an example embodiment of a part and a lattice structure.
Figure 11C:
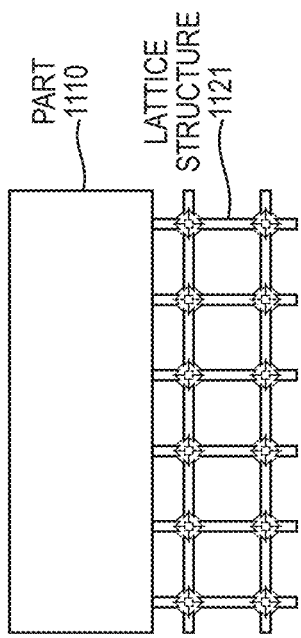
FIG. 11C is a cross-sectional view of an example embodiment of the part and lattice structure of FIG. 11B.

FIG. 11B is an oblique view of an example embodiment of a part 1110 and a lattice structure 1121. The lattice structure 1121 may be employed as a sacrificial component in a coupled arrangement with the part 1110 or as a mechanical coupling, or portion thereof, that is formed between the part 1110 and the sacrificial component, as disclosed above. The lattice structure 1121 may have a direct mechanical coupling with the part 1110, such as shown in FIG. 11C, disclosed below. Alternatively, the lattice structure 1121 may have an indirect mechanical coupling with the part 1110, such as shown in FIG. 11D, disclosed further below.

FIG. 11C is a cross-sectional view of an example embodiment of the part 1110 and lattice structure 1121 of FIG. 11B, disclosed above. In the example embodiment of FIG. 11C, the lattice structure 1121 has been printed such that it is mechanically coupled, directly, to the part 1110.

Figure 11D:
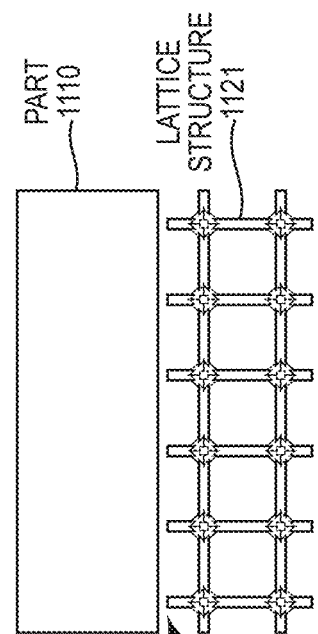
FIG. 11D is a cross-sectional view of another example embodiment of the part and lattice structure of FIG. 11B.

FIG. 11D is a cross-sectional view of another example embodiment of the part 1110 and lattice structure 1121 of FIG. 11B, disclosed above. In the example embodiment of FIG. 11D, at least one layer of unbound powder 1104 has been formed between the part 1110 and the lattice structure 1121. The part 1110 and the lattice structure 1121 are indirectly coupled, mechanically, via the at least one layer of unbound powder 1104.

Figure 12:
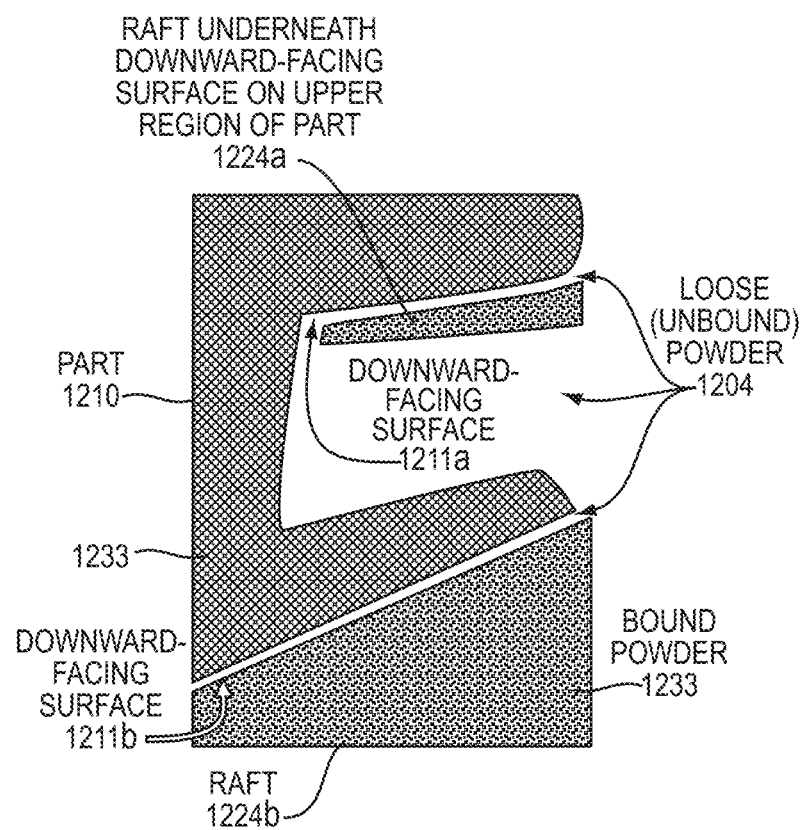
FIG. 12 is a block diagram of an example embodiment of a part and multiple sacrificial components.

FIG. 12 is a block diagram of an example embodiment of a part 1210 and multiple sacrificial components 1224a and 1224b. As disclosed in FIG. 12, creating a sacrificial component to prevent smearing on downward-facing surfaces can be applied to any downward-facing surfaces of the part 1210, not just the bottom of the part 1210. Each of the multiple sacrificial components 1224a and 1224b may have a direct or indirect mechanical coupling with a respective sacrificial component-facing surface of the part 1210, that is, the downward-facing surfaces 1211a and 1211b, in the example embodiment. In the example embodiment, the downward-facing surfaces 1211*a* and 1211*b* are indirectly coupled, mechanically, with the sacrificial components 1224*a* and 1224*b*, respectively, via the unbound powder 1204. The part 1210 and the sacrificial components 1224*a* and 1224*b* are formed of the bound powder 1233.

Turning back to FIG. 1A, the part 10 may have a part shape. Printing the sacrificial component 24 may include printing the sacrificial component 24 with a complementary shape relative to the part shape. The complementary shape may conform to a topography of the part shape at least sufficiently enough to provide for the coupled arrangement.

FIG. 13A is a block diagram of an example embodiment of a part 1310 with a part shape that includes multiple downward-facing surfaces 1311. FIG. 13B and FIG. 13C, disclosed below, disclose embodiments of a method for creating a 3D computer-aided design (CAD) model of the coupled arrangement based on the part shape of the part.

FIG. 13B is a block diagram of an example embodiment of the part 1310 of FIG. 13A and a translated copy 1314 of the part 1310. The method for creating a 3D computer-aided design (CAD) model of the coupled arrangement may include duplicating a part 3D CAD model for the part 1310 to produce a copy of the part 3D CAD model and translating the copy in a translation direction to produce the translated copy 1314. The method may further comprise performing a 3D Boolean subtraction to subtract the part 3D CAD model for the part 1310 from the translated copy 1314 to produce a sacrificial component 3D CAD model for the sacrificial component; and applying an offset 1325 between the part 3D CAD model and the sacrificial component 3D CAD model.

FIG. 13C is a block diagram of an example embodiment of a result 1324 that results from performing the 3D Boolean subtraction to subtract the part 3D CAD model for the part 1310 from the translated copy 1314 to produce a sacrificial component 3D CAD model for the sacrificial component; and applying an offset between the part 3D CAD model and the sacrificial component 3D CAD model. A coupled arrangement of the part and the sacrificial component may be printed according to the part 3D CAD model and the sacrificial component 3D CAD model.

FIG. 14A is a block diagram of another example embodiment of a part 1410 with a part shape that includes multiple downward-facing surfaces 1411. FIG. 14B-D, disclosed below, disclose embodiments of another method for creating a 3D model of a coupled arrangement based on the part shape of the part.

FIG. 14B is a block diagram of an example embodiment of an approximated version 1416 of the part 1410 of FIG. 14A. The method for creating the 3D model of the coupled arrangement based on the part shape of the part 1410 may comprise approximating surfaces of a part 3D CAD model for the part 1410 to produce and approximated version 1416, the approximated version 1416 being offset from the part 3D CAD model of the part 1410 in an outward direction via the offset 1425.

FIG. 14C is a block diagram of an example embodiment of a translated approximated version 1414 of the approximated version 1416 of FIG. 14B. The method for creating the 3D model of the coupled arrangement may comprise translating the approximated version 1416 in a translation direction to produce the translated approximated version 1416. The method may further comprise performing a 3D Boolean subtraction to subtract the approximated version 1416 from the translated approximated version 1414.

FIG. 14D is a block diagram of an example embodiment of a result 1424 from a 3D subtraction performed to subtract the approximated version 1416 from the translated approximated version 1414 with an offset applied thereto. The result 1424 may be used as a model for printing the sacrificial component. As such, sacrificial components may be printed for parts with complex features on the downward facing surfaces by printing the sacrificial component with features that, while complementary, do not interlock. Such interlocking features may be difficult to de-powder.

Figure 15A:
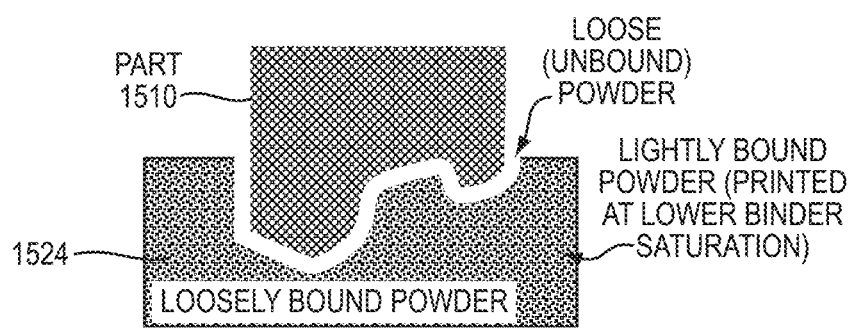
FIG. 15A-D are block diagrams of example embodiments of coupled arrangements of part and sacrificial components.

FIG. 15A is a block diagram of another example embodiment of a coupled arrangement of a part 1510 and a sacrificial component 1524. In the example embodiment, the sacrificial component 1524 is printed at a lower binder saturation level than the part 1510. The sacrificial component may be printed from powder material that is bound only lightly. In the example embodiment, a separation layer between the part 1510 and the "lightly bound" powder, that is, the sacrificial component 1524, is loose (i.e., unbound) powder that forms an indirect mechanical coupling between the part 1510 and the sacrificial component 1524.

Figure 15B:
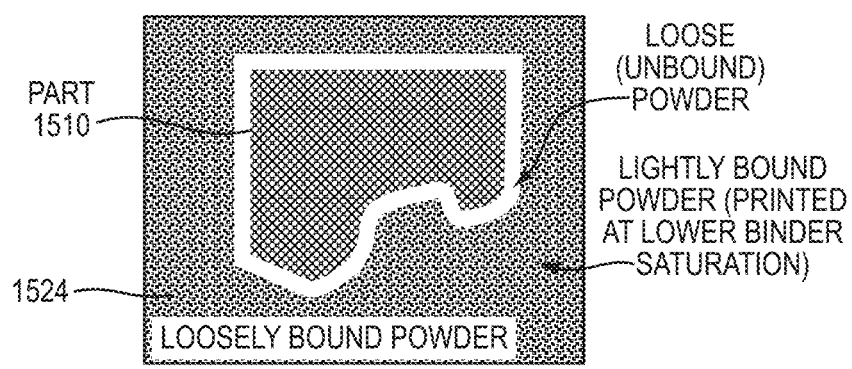

FIG. 15B is a block diagram of another example embodiment of a coupled arrangement of a part 1510 and a sacrificial component 1524. In the example embodiment, the sacrificial component 1524 is printed at a lower binder saturation level than the part 1510. The sacrificial component may be printed from powder material that is bound only lightly. In the example embodiment, a separation layer between the part 1510 and the "lightly bound" powder, that is, the sacrificial component 1524, is loose (i.e., unbound) powder and the sacrificial component 1524 surrounds the part 1510 and forms an indirect mechanical coupling between the part 1510 and the sacrificial component 1524.

Figure 15C:
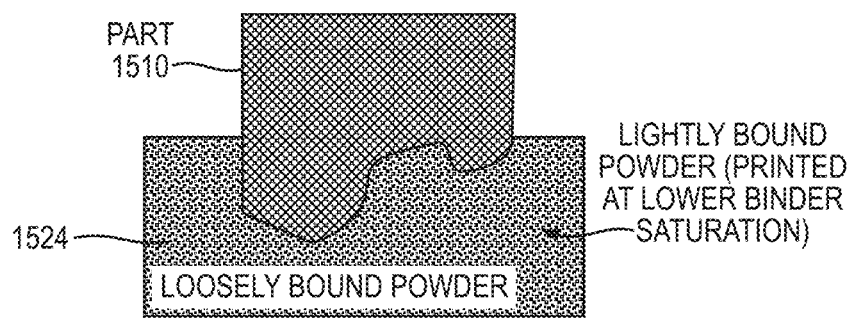

FIG. 15C is a block diagram of another example embodiment of a coupled arrangement of part 1510 and a sacrificial component 1524. In the example embodiment, the sacrificial component 1524 is printed at a lower binder saturation level than the part 1510. The sacrificial component may be printed from powder material that is bound only lightly. In the example embodiment, there is no separation layer between the part 1510 and the "lightly bound" powder, that is, the sacrificial component 1524. The part 1510 and the sacrificial component 1524 have a direct mechanical coupling formed between the bound powder of the part 1510 and the "lightly bound" powder of the sacrificial component 1524.

Figure 15D:
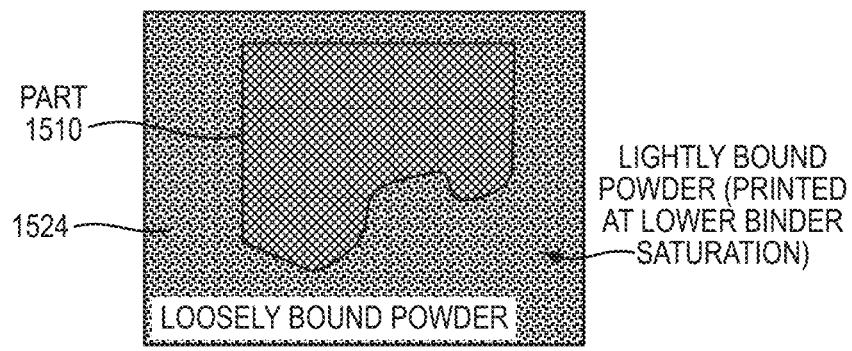

FIG. 15D is a block diagram of another example embodiment of a coupled arrangement of part 1510 and a sacrificial component 1524. In the example embodiment, the sacrificial component 1524 is printed at a lower binder saturation level than the part 1510. The sacrificial component may be printed from powder material that is bound only lightly. In the example embodiment, there is no separation layer between the part 1510 and the "lightly bound" powder, that is, the sacrificial component 1524, and the sacrificial component 1524 surrounds the part 1510. The part 1510 and the sacrificial component 1524 have a direct mechanical coupling formed between the bound powder of the part 1510 and the "lightly bound" powder of the sacrificial component 1524.

According to the example embodiments of FIGS. 15A-D, disclosed above, binder may be printed (i.e., jetted) into the powder bed beneath and/or surrounding the part, at a lower concentration (saturation level) of binder than is required to fully bind the powder together, effectively locking the powder in place and preventing layer shifting. After drying/crosslinking, the "lightly bound" powder would not be held together and, thus, could be removed (i.e., de-coupled) from the printed part. Such a method could be applied using a separation layer between the part and the "lightly bound" powder, that is, the sacrificial component, or with no separation therebetween.

FIG. 16A is an image of an example embodiment of a portion of a part 1610 with layer shifting.

FIG. 16B is an image of an example embodiment of the part 1610 of FIG. 16A without layer shifting and a sacrificial component 1624.

FIG. 16C is an image of the example embodiment of the part 1610 of FIG. 16B without layer shifting.

Figure 17:
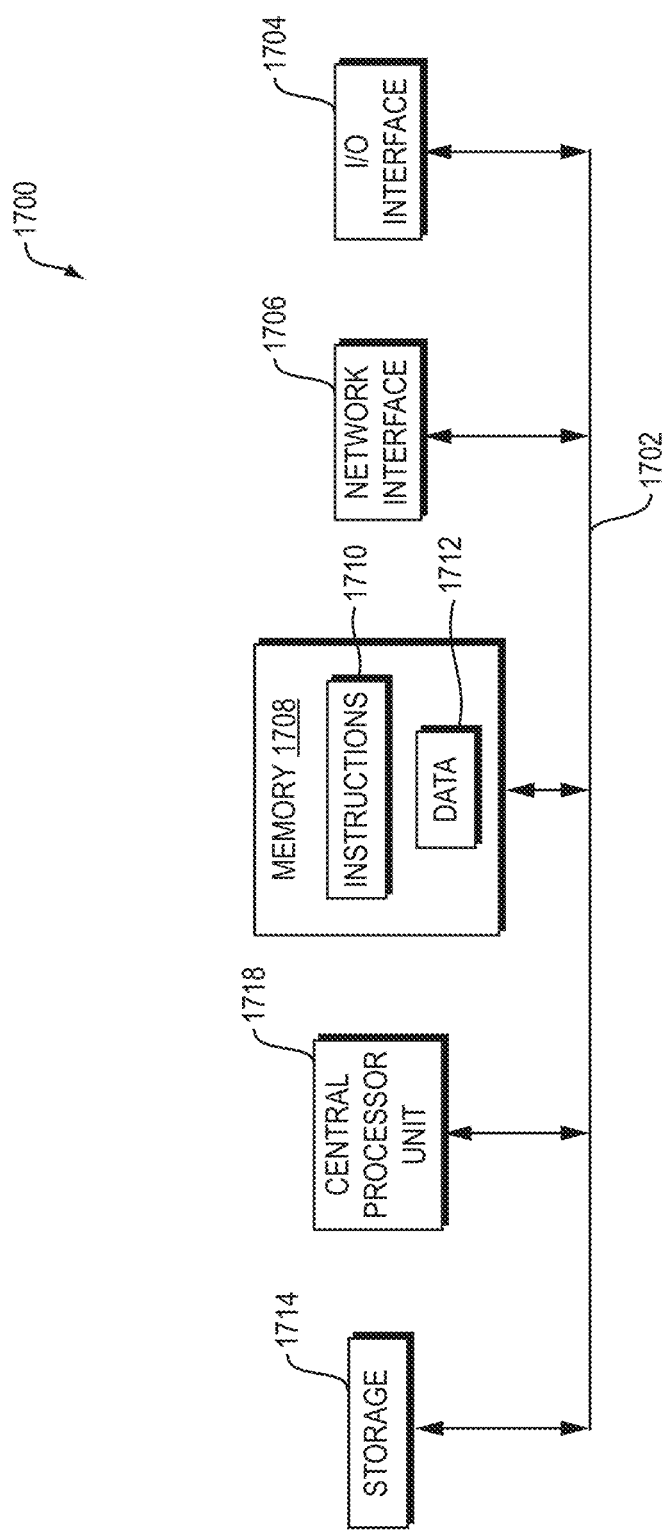
FIG. 17 is a block diagram of an example internal structure of a computer optionally within an embodiment disclosed herein.

FIG. 17 is a block diagram of an example of the internal structure of a computer 1700 in which various embodiments of the present disclosure may be implemented. The computer 1700 contains a system bus 1702, where a bus is a set of hardware lines used for data transfer among the components of a computer or processing system. The system bus 1702 is essentially a shared conduit that connects different elements of a computer system (e.g., processor, disk storage, memory, input/output ports, network ports, etc.) that enables the transfer of information between the elements. Coupled to the system bus 1702 is an I/O device interface 1704 for connecting various input and output devices (e.g., keyboard, mouse, displays, printers, speakers, etc.) to the computer 1700. A network interface 1706 allows the computer 1700 to connect to various other devices attached to a network. Memory 1708 provides volatile or non-volatile storage for computer software instructions 1710 and data 1712 that may be used to implement embodiments of the present disclosure, where the volatile and non-volatile memories are examples of non-transitory media. Disk storage 1714 provides non-volatile storage for computer software instructions 1710 and data 1712 that may be used to implement embodiments of the present disclosure. A central processor unit 1718 is also coupled to the system bus 1702 and provides for the execution of computer instructions.

Further example embodiments disclosed herein may be configured using a computer program product; for example, controls may be programmed in software for implementing example embodiments. Further example embodiments may include a non-transitory computer-readable medium containing instructions that may be executed by a processor, and, when loaded and executed, cause the processor to complete methods described herein. It should be understood that elements of the block and flow diagrams may be implemented in software or hardware, such as via one or more arrangements of circuitry of FIG. 17, disclosed above, or equivalents thereof, firmware, a combination thereof, or other similar implementation determined in the future. In addition, the elements of the block and flow diagrams described herein may be combined or divided in any manner in software, hardware, or firmware. If implemented in software, the software may be written in any language that can support the example embodiments disclosed herein. The software may be stored in any form of computer readable medium, such as random access memory (RAM), read only memory (ROM), compact disk read-only memory (CD-ROM), and so forth. In operation, a general purpose or application-specific processor or processing core loads and executes software in a manner well understood in the art. It should be understood further that the block and flow diagrams may include more or fewer elements, be arranged or oriented differently, or be represented differently. It should be understood that implementation may dictate the block, flow, and/or network diagrams and the number of block and flow diagrams illustrating the execution of embodiments disclosed herein.

The teachings of all patents, published applications and references cited herein are incorporated by reference in their entirety.

While example embodiments have been particularly shown and described, it will be understood by those skilled in the art that various changes in form and details may be made therein without departing from the scope of the embodiments encompassed by the appended claims.

What is claimed is:

1. A method of forming a part via additive manufacturing, the method comprising:
   producing a CAD model of the part;
   producing a copied or approximated version of the CAD model of the part;
   translating the copied or approximated version to produce a translated version;
   using Boolean subtraction to subtract the CAD model of the part from the translated version to produce a CAD model of the sacrificial component;
   offsetting the CAD model of the part and the CAD model of the sacrificial component, wherein the part and the sacrificial component are formed according to the CAD model of the part and the CAD model of the sacrificial component, respectively;
   forming a portion of a sacrificial component by:
      depositing a first layer of a powder;
      depositing a first amount of fluid onto a first area of the first layer of the powder to bind the powder;
      after depositing the first amount of fluid, depositing a second layer of the powder on top of the first layer of the powder;
      depositing a second amount of fluid onto a second area of the second layer of the powder to bind the powder, wherein the first area and the second area do not overlap along a z-axis; and
   forming a portion of the part by:
      depositing a third layer of the powder on top of the second layer of the powder, wherein the fluid has not been deposited onto a third area of the second layer of the powder;
      depositing a third amount of fluid onto a fourth area of the third layer of the powder to bind the powder, wherein the first area, the third area, and the fourth area at least partially overlap along the z-axis;
      depositing a fourth layer of the powder on top of the third layer of the powder, wherein fluid has not been deposited onto a fifth area of the third layer of powder; and
      depositing a fourth amount of fluid onto a sixth area of the fourth layer of powder to bind the powder, wherein the second area, the fifth area, and the sixth area at least partially overlap along the z-axis.

2. The method of claim 1, wherein a surface of the sacrificial component facing the part has a complementary shape of a surface of the part facing the sacrificial component.

3. The method of claim 1, wherein depositing the first, the second, and the third layers of the powder includes spreading each of the first, the second, and the third layers of the powder, respectively, using a spreading mechanism.

4. The method of claim 1, wherein, after depositing the second amount of fluid, the second area of the second layer of the powder remains free of the fluid.

5. The method of claim 1, wherein the first amount of fluid is deposited at a first saturation level, wherein the second amount of fluid is deposited at a second saturation level, and wherein the first saturation level is lower than the second saturation level.

6. The method of claim 1, wherein forming the portion of the sacrificial component includes forming a lattice structure.

7. The method of claim 1, wherein the portion of the sacrificial component is coupled to the portion of the part via indirect mechanical coupling.

8. The method of claim 1, further comprising forming a second portion of the sacrificial component, wherein the part does not extend further than the second portion of the sacrificial component along the z-axis.

* * * * *